United States Patent
Ali et al.

(10) Patent No.: US 11,965,762 B2
(45) Date of Patent: Apr. 23, 2024

(54) FLOW SENSOR

(71) Applicant: Flusso Limited, Cambridge (GB)

(72) Inventors: Syed Zeeshan Ali, Cambridge (GB); Andrea De Luca, Cambridge (GB); Cerdin Lee, Trumpington (GB); Tim Butler, Cambridge (GB); Ethan Gardner, Kineton (GB); Florin Udrea, Cambridge (GB)

(73) Assignee: Flusso Limited, Cambridge (GB)

( * ) Notice: Subject to any disclaimer, the term of this patent is extended or adjusted under 35 U.S.C. 154(b) by 0 days.

(21) Appl. No.: 16/658,725

(22) Filed: Oct. 21, 2019

(65) Prior Publication Data

US 2021/0116280 A1   Apr. 22, 2021

(51) Int. Cl.
*G01F 1/684* (2006.01)
*G01F 1/696* (2006.01)
*G01F 1/688* (2006.01)

(52) U.S. Cl.
CPC .......... *G01F 1/6845* (2013.01); *G01F 1/6847* (2013.01); *G01F 1/696* (2013.01); *G01F 1/6888* (2013.01)

(58) Field of Classification Search
CPC .... G01F 1/6845; G01F 1/6847; G01F 1/6888; G01F 1/696
See application file for complete search history.

(56) References Cited

U.S. PATENT DOCUMENTS

| | | | |
|---|---|---|---|
| 4,548,078 A | 10/1985 | Bohrer et al. | |
| 6,460,411 B1 | 10/2002 | Kersjes et al. | |
| 6,527,835 B1 | 3/2003 | Manginell et al. | |
| 6,898,981 B1 * | 5/2005 | Boillat | G01F 1/363 73/756 |
| 6,971,266 B2 * | 12/2005 | Kawai | G01F 1/692 73/204.26 |
| 6,981,410 B2 * | 1/2006 | Seki | G01F 1/6845 73/204.26 |

(Continued)

FOREIGN PATENT DOCUMENTS

| | | |
|---|---|---|
| DE | 102010028387 A1 | 11/2010 |
| EP | 1365216 A1 | 11/2003 |

(Continued)

OTHER PUBLICATIONS

International Search Report and Written Opinion from corresponding International Application No. PCT/EP2020/079566, dated Jan. 21, 2021, 16 pages.

(Continued)

*Primary Examiner* — Justin N Olamit
(74) *Attorney, Agent, or Firm* — Fisher Broyles, LLP

(57) ABSTRACT

We disclose herein a flow sensor comprising: a first substrate comprising an etched portion, a dielectric region located on a first side of the first substrate, wherein the dielectric region comprises at least one dielectric membrane located over the etched portion of the first substrate, a sensing element located on or within the dielectric membrane, and a second substrate adjoining a second side of the first substrate. The first side of the first substrate and the second side of the first substrate are opposite sides. The first substrate and the second substrate cooperate to form a sensing channel through the flow sensor.

19 Claims, 11 Drawing Sheets

(56) References Cited

U.S. PATENT DOCUMENTS

| | | | |
|---|---|---|---|
| 7,104,768 B2* | 9/2006 | Richter | F04B 43/14 |
| | | | 417/423.2 |
| 7,383,726 B2* | 6/2008 | Ike | G01F 1/6842 |
| | | | 73/204.22 |
| 7,603,898 B2* | 10/2009 | Speldrich | G01F 15/006 |
| | | | 73/204.26 |
| 7,703,339 B2* | 4/2010 | Suloff, Jr. | G01F 15/14 |
| | | | 73/861.85 |
| 7,905,140 B2 | 3/2011 | Kanne | |
| 8,033,180 B2* | 10/2011 | Morales | G01F 1/48 |
| | | | 73/760 |
| 8,286,478 B2* | 10/2012 | Speldrich | G01F 1/692 |
| | | | 73/204.23 |
| 8,418,549 B2 | 4/2013 | Speldrich et al. | |
| 8,677,818 B2* | 3/2014 | Landsberger | G01F 1/6888 |
| | | | 73/204.11 |
| 9,282,389 B1* | 3/2016 | Khenkin | H04R 1/08 |
| 10,139,256 B2 | 11/2018 | Zhao et al. | |
| 10,616,703 B2* | 4/2020 | Steiert | H04R 19/02 |
| 2004/0118218 A1 | 6/2004 | Mayer et al. | |
| 2005/0022593 A1 | 2/2005 | Franz | |
| 2006/0288773 A1 | 12/2006 | Ike et al. | |
| 2009/0158838 A1 | 6/2009 | Speldrich | |
| 2011/0252882 A1* | 10/2011 | Beck | G01F 15/14 |
| | | | 73/204.27 |
| 2014/0311912 A1 | 10/2014 | Shih et al. | |
| 2018/0017249 A1 | 1/2018 | Karkow et al. | |
| 2019/0107421 A1 | 4/2019 | Akagi et al. | |

FOREIGN PATENT DOCUMENTS

| | | |
|---|---|---|
| EP | 1816444 A2 | 8/2007 |
| EP | 2040045 A2 | 3/2009 |
| EP | 2040046 A2 | 3/2009 |

OTHER PUBLICATIONS

B. Van Oudheusden, "Silicon flow sensors," in Control Theory and Applications, IEE Proceedings D, 1988, pp. 373-380.

B. Van Oudheusden, "Silicon thermal flow sensors," Sensors and Actuators A: Physical, vol. 30, pp. 5-26, 1992.

N. Nguyen, "Micromachined flow sensors—A review," Flow measurement and Instrumentation, vol. 8, pp. 7-16, 1997.

Y.-H. Wang et al., "MEMS-based gas flow sensors," Microfluidics and nanofluidics, vol. 6, pp. 333-346, 2009.

J. T. Kuo et al., "Micromachined Thermal Flow Sensors—A Review," Micromachines, vol. 3, pp. 550-573, 2012.

* cited by examiner

FLOW SENSOR

FIELD

The present disclosure relates to flow sensors, particularly but not exclusively, the disclosure relates to MEMS based fluid flow sensors.

BACKGROUND

Thermal fluid flow sensors utilise the thermal interaction between the sensor itself and the fluid. Depending upon the physical phenomena governing the interaction, flow sensors can be can be classified into the following three categories:
  (i) anemometric sensors that measure the convective heat transfer induced by fluid flow passing over a heated element;
  (ii) calorimetric sensors that detect the asymmetry of the temperature profile generated by a heated element and caused by the forced convection of the fluid flow; and
  (iii) time of flight (ToF) sensors that measure the time elapsed between the application and the sensing of a heat pulse.

Reviews of thermal fluid flow sensor have been published in (B. Van Oudheusden, "Silicon flow sensors," in Control Theory and Applications, IEE Proceedings D, 1988, pp. 373-380; B. Van Oudheusden, "Silicon thermal flow sensors," Sensors and Actuators A: Physical, vol. 30, pp. 5-26, 1992; N. Nguyen, "Micromachined flow sensors-A review," Flow measurement and Instrumentation, vol. 8, pp. 7-16, 1997; Y.-H. Wang et al., "MEMS-based gas flow sensors," Microfluidics and nanofluidics, vol. 6, pp. 333-346, 2009; J. T. Kuo et al., "Micromachined Thermal Flow Sensors-A Review," Micromachines, vol. 3, pp. 550-573, 2012). Further background can also be found in U.S. Pat. No. 6,460,411 by Kersjes et al.

Generally, a thermal flow sensor comprises a heating element and a temperature sensing element thermally isolated from a substrate (e.g. embedded within a membrane, a bridge, a cantilever, etc.). Both heating and temperature sensing elements are typically positioned in the most thermally isolated area (e.g. in the centre of a membrane, in the centre of a bridge, and the end of a cantilever, etc.). Flow sensors based on other principles such as ultrasonic or pressure based are also possible.

Generally, sensor chips are packaged on a substrate, and covered with a lid having inlets & outlets for fluid flow. Examples are given in U.S. Pat. No. 8,418,549B2, US20180172493. However, such packages tend to be bulky, making them unsuitable for space constrained applications, such as handheld devices.

US2014/0311912 reports a device where the sensor chip/substrate is covered with a lid that makes up the channel. The bond pads are not covered by the lid and are used to provide electrical connection. U.S. Pat. No. 7,905,140B2 presents a device where a substrate with the flow channel is attached on top of a flow sensor chip, with electrical connections made by either wire bonding or through holes. US2004/0118218 also shows a similar device, with the flow channel substrate attached to the chip and lead throughs to form the electrical connection. U.S. Pat. No. 10,139,256 describes a device made from two semiconductor substrates bonded together, with one having the inlet to the flow channel, and one an outlet. One of the substrates has the flow sensor. Electrical connection is made by conducting vias and conductive flow paths on the surface of the substrates. U.S. Pat. No. 4,548,078A describes a flow channel through the back of a flow sensor chip.

SUMMARY

Aspects and preferred features are set out in the accompanying claims.

According to a first aspect of the present disclosure there is provided a flow sensor package comprising: a first substrate comprising an etched portion; a dielectric region located on a first side of the first substrate, wherein the dielectric region comprises at least one dielectric membrane located over the etched portion of the first substrate; a sensing element located on or within the dielectric membrane; and a second substrate adjoining a second side of the first substrate, wherein the first side of the first substrate and the second side of the first substrate are opposite sides, and wherein the first substrate and the second substrate cooperate to form a sensing channel through the flow sensor package.

The sensing channel may extend laterally through the device providing a fluid flow path laterally through the sensor package, past the sensing element of the flow sensor. In other words, the sensing channel may be defined by the cooperation of the shapes of the first substrate and the second substrate, and/or defined as a region between the substrates which includes the etched portion of the first substrate.

In this disclosure, the term 'flow sensor' is used to refer to the membrane region with the sensing element. The term 'flow sensor chip' is used to refer to the flow sensor on the first substrate. The term 'flow sensor package' is used to refer to the flow sensor chip with further substrates.

The dielectric region may comprise a dielectric layer or a plurality of layers including at least one dielectric layer. Generally speaking, a dielectric membrane region may be located immediately adjacent to the etched portion of the substrate. The dielectric membrane region corresponds to the area of the dielectric region above (or below depending upon the configuration) the etched cavity portion of the substrate. For example, in a flip-chip configuration the dielectric membrane will be shown below the etched cavity portion of the substrate. Each dielectric membrane region may be over a single etched portion of the first substrate.

The second substrate may comprise a single substrate or may comprise a substrate assembly formed of a plurality of portions of different substrates.

The flow sensor chip may comprise a silicon substrate and a dielectric layer or layers comprising silicon oxide and silicon nitride.

The device may be connectable to a connection substrate in a flip-chip configuration, via conductive joints. Such a device allows a more compact, and lower cost system than currently available. The use of flip-chip with an upside down membrane, and conductive joints allows a more compact electrical connection of the sensing and power elements compared to bond wires, while being more cost effective and simpler than through vias. Having the flow channel on the backside of the chip, and utilizing the etched portion of the first substrate allows the use of solder balls.

At least one heater may be embedded within the membrane. The heater may be made of, for example, polysilicon, aluminium, tungsten, titanium, or single crystal silicon, and may be a diode, a transistor, or other type of heater.

At least one temperature sensor may be located within the membrane. The temperature sensor may be either a resistor, a thermocouple, or a thermopile. The temperature sensor or the heater may act as a sensing element within the flow sensor.

The flow sensor may be a thermal sensor that works on anemometric, calorimetric, time of flight principle, or other non-thermal principles. In the anemometric principle, the power element is in the form of at least one heater embedded in the membrane. The flow of fluid through the flow sensor package increases the power consumption on the heater. The heater may be operated in either constant temperature, constant power, constant current, or constant voltage mode. In a calorimetric principle, the membrane includes at least one heater and at least one (but typically two) temperature sensors (or temperature sensing elements). The heater may be operated in constant temperature mode, while the reading from the temperature sensor, or sensors may vary with the fluid flow.

In embodiments utilising the time of flight principle, a heater and temperature sensor may be present. The power applied to the heater is varied, and the time taken for the signal to reach the temperature sensor determines the rate of fluid flow and can also be used to determine other fluid parameters.

The heater may be a resistive heater made of a CMOS material, such as aluminium, polysilicon, tungsten, titanium or single crystal silicon. Alternatively, the heater can be a diode or a transistor. The heater can also be a non-CMOS material, such as platinum.

Similarly, the temperature sensor or sensing element may be either a resistive temperature sensor, made of platinum, tungsten, aluminium, polysilicon, titanium or single crystal silicon. Alternatively, the sensing element may be a thermocouple, or a thermopile made with a combination of metal, polysilicon or single crystal silicon.

The membrane may also have one or more piezo-resistors made of polysilicon, single crystal silicon, or another semiconductor.

The second substrate which forms the channel along with the semiconductor cavity may be any material such as metal, plastic, glass or a semiconductor.

The flow sensor chip may comprise electrical connections on an outer surface of the dielectric region.

The etched (cavity) portion of the first substrate may have sloped or sloping side walls. In other words the sidewalls of the etched portion may be slanted or at an acute angle to an adjacent surface or the lower surface of the sensing channel. The sloping sidewalls may be formed by KOH or TMAH etching.

The etched (cavity) portion of the first substrate may have sidewalls that are perpendicular to a lower surface of the sensing channel. In other words the sidewalls may be straight and vertical or perpendicular to the surface of the dielectric region. The vertical sidewalls may be formed by DRIE etching.

The substrate of the flow sensor chip may have the cavity with sloping sidewalls (formed by KOH or TMAH (Tetramethylammonium hydroxide) etching), or with vertical sidewalls (formed by Deep Reactive Ion Etching (DRIE)). The cavity in the first substrate may be etched from the backside of the chip (the side opposite the dielectric)—and may etch all the way up to the dielectric region or be etched partway. The dielectric region adjacent to the cavity can be called as a membrane, and the membrane may or may not have holes or discontinuities.

The flow sensor package may further comprise a restrictor. The restrictor may be formed in the sensing channel. The restrictor may be a narrowing of part of the flow channel. The restrictor may be formed in the flow inlet channel, the flow outlet channel, and/or the flow sensing channel. The restrictor helps to make the flow more independent of outside connections. The channel formed may have a restrictor within it that helps against variability in connection and manufacturing. The channel may also extend in the horizontal direction.

The second substrate may be configured such that a top surface of the sensing channel is flat. In other words, the second substrate does not have a protrusion extending into the sensing channel. This makes the design of the second substrate easier and still allows some of the fluid flow to be in connect with the dielectric membrane within the sensing channel.

Alternatively, the second substrate may comprise a protrusion extending towards the sensing channel.

The flow sensor package may further comprise a flow inlet channel and a flow outlet channel.

The inlet (or flow inlet channel) and outlet (or flow outlet channel) may be either vertical, or horizontal, or a combination. Further, the inlet & outlet can be a straight connection, a barbed connection, or just an opening in the substrate without any protrusion. The inlet/outlet can also have grooves, or a small protrusion that matches to any other connecting device. There can also be more than one inlet and/or outlet.

The flow sensor package may further comprise a filter or gas permeable material as part of the flow sensor assembly. There may be a filter at one or both of the inlet and outlets of the sensor package. There may also be a filter between the silicon chip and the second substrate. Any of the filters may be a particle filter. In the case of a flow sensor package used for air or gases, such a filter may be a filter to prevent water or other liquids, and may comprise a polymer such as Gore-Tex, or a thin metal or dielectric with holes.

The second substrate may be moulded plastic designed in such a way as to form the sensing channel or entire flow channel with the etched portion of the silicon or first substrate. The moulded plastic may also form an inlet and outlet having barbed connections.

The second substrate may define at least two apertures, and at least one of the flow inlet channel or flow outlet channel may comprise a channel through an aperture defined by the second substrate. The second substrate may comprise at least two apertures extending through the second substrate. In other words, the second substrate may have at least one inlet opening and one outlet opening. The inlet and/or outlet openings may be on a top surface of the flow sensor package. A top surface refers to the exterior surface of the second substrate that is substantially parallel to the flow sensing channel. The openings may be on the sides of the flow sensor package. The sides refers to two opposing surfaces of the second substrate.

The second substrate may comprise a plurality of protrusions on an outer surface of the second substrate, and the one or more of the at least two apertures may extend through one or more of the plurality of protrusions. The protrusions may extend away from the sensing channel. The protrusions may be perpendicular to the sensing channel, and the flow inlet channel and flow outlet channel may then be perpendicular to the sensing channel. In this embodiment, fluid enters and exits the flow sensor package in opposite directions. Alternatively, the protrusions may be parallel to the sensing channel, and the flow inlet channel and flow outlet channel may then be parallel to the sensing channel. In this embodiment, fluid enters and exits the flow sensor in the same direction.

The plurality of protrusions may be configured to enable the sensor package to be coupled with another device. At least one of the plurality of protrusions may have a barbed connection.

A top surface of the second substrate may be flat such that the flow inlet channel and the flow outlet channel terminate on the top surface of the second substrate. The top surface may be defined as the exterior surface of the second substrate that extends in a lateral direction, substantially parallel to the sensing channel. The apertures or openings defining the flow inlet channel and the flow outlet channel may be flat.

The second substrate may have a substantially flat surface with a small groove, or rim, to allow alignment with another device having an opening with a groove or rim.

The flow inlet channel and the flow outlet channel may be defined on opposite surfaces of the flow sensor package. In other words the flow inlet channel and flow outlet channel may be on opposite sides of the flow sensor package such that fluid travels in one direction through the sensor package. Fluid enters in same direction as it leaves, and therefore the sensor package can be used in a continuous flow.

The first substrate and the second substrate may cooperate to define the flow inlet channel and the flow outlet channel. In other words, the flow inlet channel and the flow outlet channel may be defined by the cooperation of the shapes of the first substrate and the second substrate, and/or defined as a region between the substrates.

The second substrate may comprise a planar (flat) substrate sheet comprising two opposing parallel flat surfaces, and one of the parallel flat surfaces may be adjacent to the sensing channel, the flow inlet channel and the flow outlet channel. In other words, the second substrate may be planar with two opposing flat surfaces, one of which defines a top surface of the sensing channel.

The first substrate and the second substrate may be configured such that one or both of the flow inlet channel and the flow outlet channel have a larger cross-section at a peripheral end than at an end closest to the sensing channel. Either one or both of the first substrate and second substrate may have a sloping edge. The peripheral end may be defined as an outermost end or exterior end, closest to where fluid enters and leaves the sensor package. The end closest to the sensing channel may be an innermost end.

The sensing channel may comprise a protective coating. The sensing channel may be coated with a protective coating. This may also be present on the flow inlet channel and/or the flow outlet channel. The flow channel may have one or more protective coatings on the flow sensor chip as well as the second substrate forming the channel. The flow channel refers to the continuous channel formed by the sensing channel, the flow inlet channel, and the flow outlet channel. Such a coating may improve corrosion resistance of the sensor to any fluid flowing through it. It may also make the sensor package biocompatible for the range of fluids flowing through. The coating may comprise a polymer such as parylene.

The second substrate may be formed of a semiconductor material. The second substrate may be a semiconductor or glass.

The flow sensor package may further comprise a third substrate adjoined to the second substrate on an opposite side of the second substrate to the sensing channel. The third substrate may define the flow inlet channel and the flow outlet channel. The third substrate may also be a semiconductor substrate.

The etched portion of the first substrate may define at least two etched cavities and one or more connecting channels. The etched cavities may be fluidly connected to each other by the connecting channels. The connecting channels may be substantially narrower than the etched cavities. The connecting channels may have a channel width of between 10 µm to 200 µm. The cavities may adjoin the flow inlet channel and the flow outlet channels.

The flow sensor or flow sensor chip may comprise more than one flow sensing element. The dielectric region may comprise at least two dielectric membranes corresponding to the at least two etched cavities. The dielectric region may comprise a plurality of sensing elements, each of the plurality of sensing elements may be formed within a separate dielectric membrane, each forming separate flow sensors. The sensing channel formed through the flow sensors of the flow sensor package may flow through past each sensing element in the dielectric region. In other words, the sensing channel may flow past a plurality of dielectric membranes, where each dielectric membrane is operating as a separate flow sensor, and therefore one or more sensing elements are formed within each dielectric membrane. This does not limit the dielectric membranes to contain only one sensing element, but there may multiple dielectric membranes each with one or more sensing elements and therefore each dielectric membrane is operating as a flow sensor.

The horizontal widths, or the vertical height, of the sensing channel at each sensing element may be varied to allow measurement at different flow ranges.

The at least two dielectric membranes may have different areas. This refers to the area of the surface of the dielectric membrane that is adjacent to the sensing channel. Each flow sensing element may be formed within a different size dielectric membrane, or each plurality of flow sensing elements operating as a flow sensor may be formed within a different size membrane.

The sensing channel may comprise a plurality of sensing channel regions each corresponding to one or more of the plurality of sensing elements. Each of the plurality of sensing channel regions may have a different cross-section. The sensing channel at each flow sensing element or each plurality of flow sensing elements may have a different cross-section.

The flow sensor may comprise a heating element located within the dielectric membrane, and the dielectric membrane may comprise one or more discontinuities located between the heating element and an edge of the dielectric membrane. An edge of the dielectric membrane may refer to a perimeter edge of the dielectric membrane, in other words, the area where the dielectric membrane meets or joins the first substrate. The area of the dielectric region above the first substrate may refer to the area of the dielectric region outside the dielectric membrane.

There may be holes or discontinuities within the dielectric membrane. The discontinuities in the dielectric membrane provide an interruption in the thermal conduction path through the solid of the dielectric membrane. In use, these discontinuities contain gas from the fluid flow, and this can be measured by the change in the thermal conduction through the device. The sensitivity and accuracy to the flow composition (e.g. $CO_2$ percentage or ppm value in air) could be significantly improved by the presence of the holes through the membranes and/or by the flow itself. Higher flow rates or velocities allow for increased signal to differentiate fluids (or components of a fluid) with different thermal conductivities. This is because the thermal losses from the heater through the flow itself are both conductive and convective in nature and the convection (movement of fluid atoms with the flow) helps to enhance heat conduction process through the fluid rather than the membrane. As a result, the differential signal due to the presence of a fluid or component of a fluid ($CO_2$) that has a different thermal conductivity than a reference fluid or another component of the fluid (e.g. air) could be enhanced, as more heat conduction occurs through the fluid rather than through the dielectric membrane.

The flow sensor package may comprise more than one first substrate, and the substrates may have etched portions to form a flow channel or sensing channel. At least one of the first substrates may have integrated circuitry.

The flow sensor package may also have a gas sensor on the same sensor chip. The gas sensor may be on the same membrane as the flow sensor, or a different membrane within the same chip. The gas sensor may be a thermal conductivity type sensor that only requires a heater embedded within the membrane, or it may be a resistive type gas sensor that requires a heater within the membrane as well as electrodes connected to a gas sensing material. The electrodes and the gas sensing material could be adjacent to the membrane within the cavity in the first substrate. Other sensors such as temperature sensors or a pressure sensors may also be present on the chip.

The flow sensor package may further comprise a connection substrate electrically connected to bond pads on an exterior surface of the dielectric region. The bond pads may be on an exterior surface of the flow sensor or flow sensor chip.

The flow sensor package may be a flow sensor chip in a chip scale package comprising: a flow sensor chip, comprising at least one first substrate and a dielectric on the front side of the first substrate, which may also be the front side of the chip. The first substrate may have an etched portion, and the part of the dielectric adjacent to the etched portion may be referred to as a membrane. The flow sensor package may further comprise a second substrate attached to the backside of the semiconductor substrate, on the backside of the chip. The second substrate, and the etched portion of the first substrate may together form the sensing channel for fluids. Furthermore, there may be exposed metal bond pads on the front side of the chip. The flow sensor package may further comprise a connection substrate, which may be attached to the bond pads on the front side of the flow sensor chip by means of conductive joints.

The flow sensor chip may have circuitry on the chip, or may be without any circuitry. The sensor may be used for gases or liquids.

The connection substrate may be electrically connected to the bond pads using solder balls. Alternatively, the connection substrate may be electrically connected to the bond pads using bumps or pillars formed of copper or gold. The conductive joints may be solder balls or the conductive joints may be bumps or pillars and may be made of either copper or gold. The conductive joints can be solder balls, but can also be solder bumps or pillars, made of copper, gold or aluminium.

The connection substrate may comprise a printed circuit board (PCB) material. The connection substrate may be a PCB, and the second substrate may be a moulded plastic.

The connection substrate may comprise a semiconductor chip. The connection substrate may be another semiconductor chip. The connection substrate may be a silicon chip with circuitry to interface with the flow sensor. The circuit chip can in turn be connected to a PCB by wire bonding or through silicon vias.

The semiconductor chip may comprise integrated circuitry for the flow sensor. The integrated circuitry may be an application specific integrated circuit (ASIC) connected to PCB with bonding wires. The semiconductor chip may have interface circuitry for the flow sensor. The flow sensor chip may also have circuitry on the same chip.

The flow sensor package may further comprise sealant between the flow sensor and the connection substrate. There may be a sealant between the flow sensor chip and the connection substrate.

According to a further aspect of the present disclosure there is provided a method of manufacturing a flow sensor package, the method comprising: forming a first substrate comprising an etched portion; forming a dielectric region located on a first side of the first substrate, wherein the dielectric region comprises at least one dielectric membrane located over the etched portion of the first substrate; forming a sensing element located on or within the dielectric membrane; and forming a second substrate adjoining a second side of the first substrate, wherein the first side of the first substrate and the second side of the first substrate are opposite sides, and wherein the first substrate and the second substrate cooperate to form a sensing channel through the flow sensor package.

The method of manufacture of the flow sensor package may include any or all of the following steps:

Fabrication of flow sensor chips at wafer level, including an etched first substrate, a dielectric on the first substrate, and the region of the dielectric adjacent to the etched portion of the first substrate called as a membrane. One or more heaters or temperature sensors may also be embedded within the membrane.

Attaching the second substrate on the backside of the wafer. In case the second substrate is a semiconductor or glass the substrate is attached by use of wafer bonding. In case the second substrate is a moulded plastic, the substrate may be attached individually to each chip using an adhesive.

Forming conductive joints (such as solder balls) on the bond pads of the flow sensor wafer Dicing the wafer into individual chips Attaching each chip to a PCB material, making the electrical connections via the conductive joints.

BRIEF DESCRIPTION OF THE FIGURES

Some embodiments of the disclosure will now be described by way of example only and with reference to the accompanying drawings in which.

DETAILED DESCRIPTION OF THE PREFERRED EMBODIMENTS

Figure 1A:
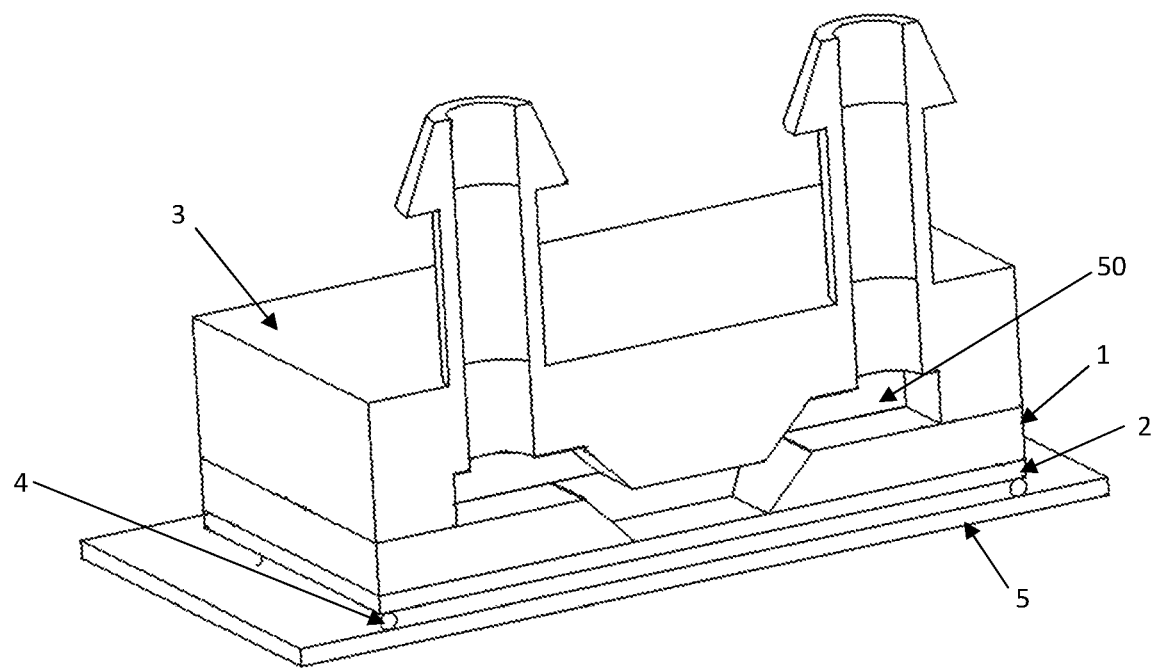
FIG. 1A illustrates schematically a three-dimensional (3D) perspective cut-through view of a flow sensor in a chip scale package, according to an embodiment of the disclosure.

Some examples of the disclosed device are given in the accompanying figures.

LIST OF REFERENCE NUMERALS

1. First substrate
2. Dielectric layer
3. Second substrate
4. Ball bonds
5. Connection substrate
6. Large circular cavity
7. Connecting channels
8. Further circular cavities
9. Protective channel coating
10. Bond wires
11. Semiconductor chip
12. PCB
15. Silicon
16. Third substrate
17. Second substrate protrusions
18. Sealant
19. Barbed connection
20. Additional device
30. Inlet/outlet surface grooves
40. Heater
41. Sensing element
42. Dielectric membrane
43. Dielectric membrane discontinuities
50. Sensing channel
52. Inlet channel
54. Outlet channel FIG. 1A illustrates schematically a three-dimensional (3D) perspective cut-through view of a flow sensor chip in a chip scale package, and FIG. 1B illustrates schematically a cross-section of the flow sensor of FIG. 1A according to an embodiment of the disclosure.

Figure 1B:
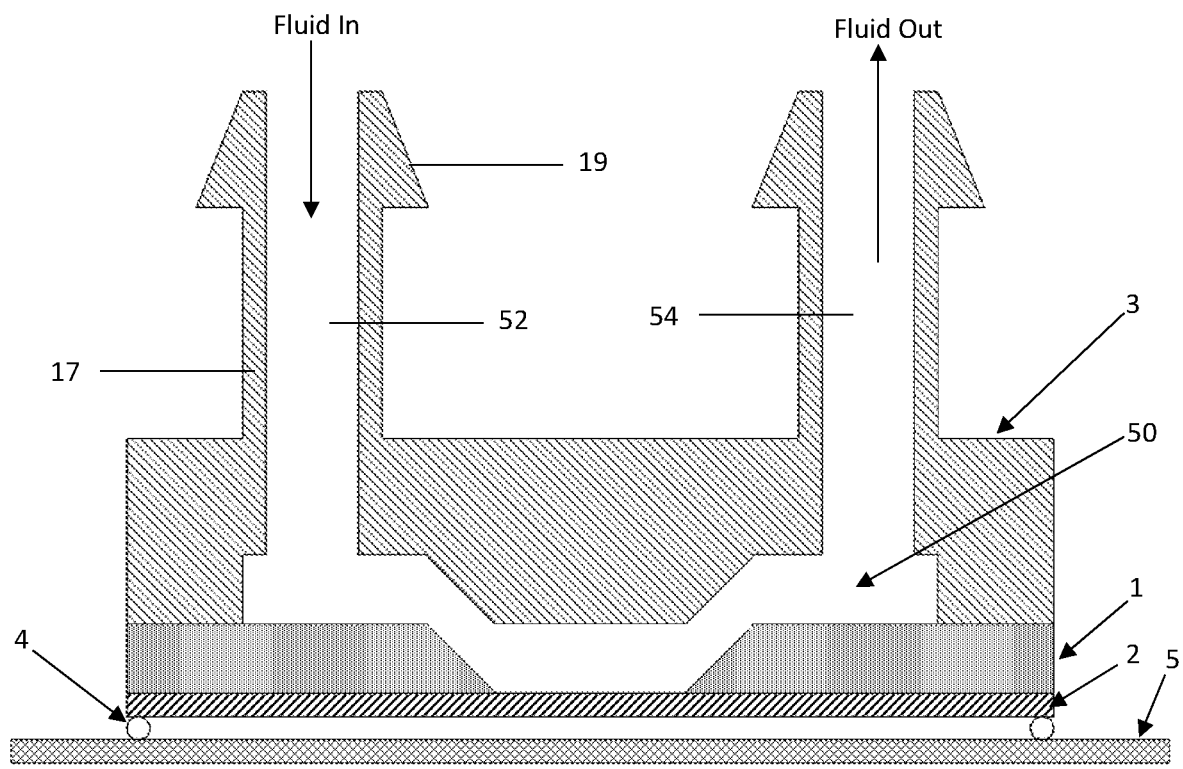
FIG. 1B illustrates schematically a cross-section of the flow sensor package of FIG. 1A according to an embodiment of the disclosure.

FIGS. 1A and 1B show a 3D and 2D schematic of a fluid flow sensor package. The flow sensor chip comprises a semiconductor (first) substrate 1, and a dielectric layer or dielectric region 2. The dielectric region is attached to a first side of the semiconductor substrate. The semiconductor (or first) substrate has a cavity or etched portion formed by etching of the semiconductor. Electrical connections, such as bond pads, may be formed on an outer surface of the dielectric region. Ball bonds 4 are used to attach the chip to a connection substrate 5. A second substrate 3 is attached to the other side of the flow sensor chip, and is designed such that shape of the second substrate 3, and the cavity in the semiconductor (or first) substrate 1 form the sensing channel 50 for the fluid flow. The second substrate is attached to a second side of the semiconductor (or first) substrate. The second substrate has a shape with indents or gaps that cooperate with the cavity of the semiconductor substrate to form a sensing channel through the flow sensor. In this embodiment, the second substrate has a protrusion that extends into the sensing channel, although in other embodiments this is not present. The second substrate 3 also has apertures or through holes that form a flow inlet channel 52 and a flow outlet channel 54. The sensing channel, the inlet channel, and the outlet channel together form one continuous flow channel through the fluid flow sensor package. The inlet channel and the outlet channel are formed through exterior protrusions 17 on the second substrate, and the protrusions has a barbed end 19 which allows a barbed connection to be made.

The semiconductor substrate 1 can be silicon. The cavity can be formed by backside etching of the substrate using either KOH or TMAH. In this embodiment the etched portion has sloped side walls. The substrate can also be another semiconductor, such as germanium, silicon carbide or gallium nitride, in which case the backside etching maybe done by other means.

The dielectric layer 2 includes one or more layers of silicon dioxide or silicon nitride but can also be other materials such as aluminium oxide. The portion of the dielectric layer 2 adjacent to the cavity of the semiconductor substrate is referred to as a dielectric membrane. The membrane may have one or more heaters, and one or more temperature sensors embedded within it. Further resistors or temperature sensors may also be embedded in the remaining part of the dielectric region outside the dielectric membrane.

The heater may be a resistive heater made of a CMOS material, such as polysilicon, single crystal silicon, aluminium, tungsten or titanium, or it can be made from the non-CMOS material such platinum. The heater can also be made from the diode or a transistor.

The temperature sensor can be a resistive temperature sensor made of polysilicon, single crystal silicon, aluminium, tungsten, titanium or platinum. Alternately, the temperature sensor can be a thermopile, including several thermocouples, with each thermocouple including two dissimilar materials such as aluminium and polysilicon. The temperature sensor can also be a diode or a transistor. The flow sensor chip can also have circuitry within the same chip.

Optionally, the membrane may also have one or more piezo elements, such as a piezo resistor. These may be made from single crystal silicon or polysilicon, or another semiconducting material. This may help determining any changes in pressure in the fluid flowing.

The connection substrate 5 can be a PCB material with pads to made electrical connection with the chip through the ball bonds. The second substrate 3 can be a moulded plastic material, and be designed or shaped such that it forms a flow sensing path or channel with the cavity in the semiconductor substrate. The example here shows one particular design, but many channel designs are possible.

Figure 2A:
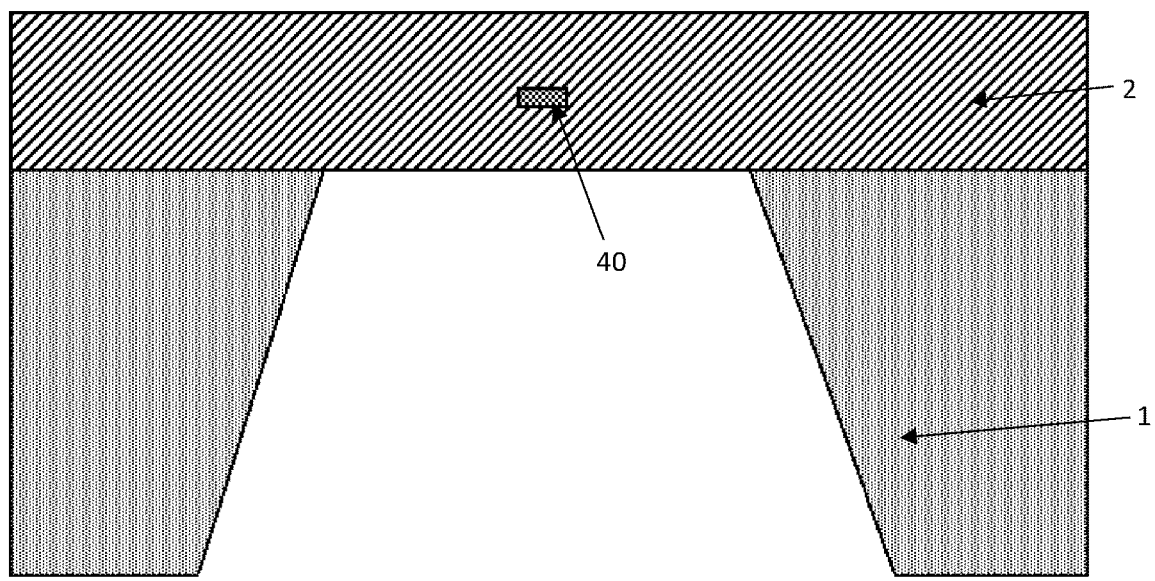
FIG. 2A illustrates schematically a cross-section of a flow sensor chip which can be used in a flow sensor chip package, according to an embodiment of the disclosure.

FIG. 2A illustrates schematically a cross-section of a flow sensor chip which can be used in a flow sensor chip package, according to an embodiment of the disclosure. The flow sensor chip includes a semiconductor substrate 1 with an etched portion, a dielectric layer 2 on top of the semiconductor substrate. The area of the dielectric layer above the etched portion is referred to the as a dielectric membrane. The device includes a heater or heating element 40 embedded within the dielectric membrane, the heater in this case being a hotwire. The heater may be a resistive heater made from a material such as tungsten, aluminium, polysilicon, single crystal silicon, titanium or platinum. It could also be a diode or a transistor. The heater may operate as a sensing element.

Figure 2B:
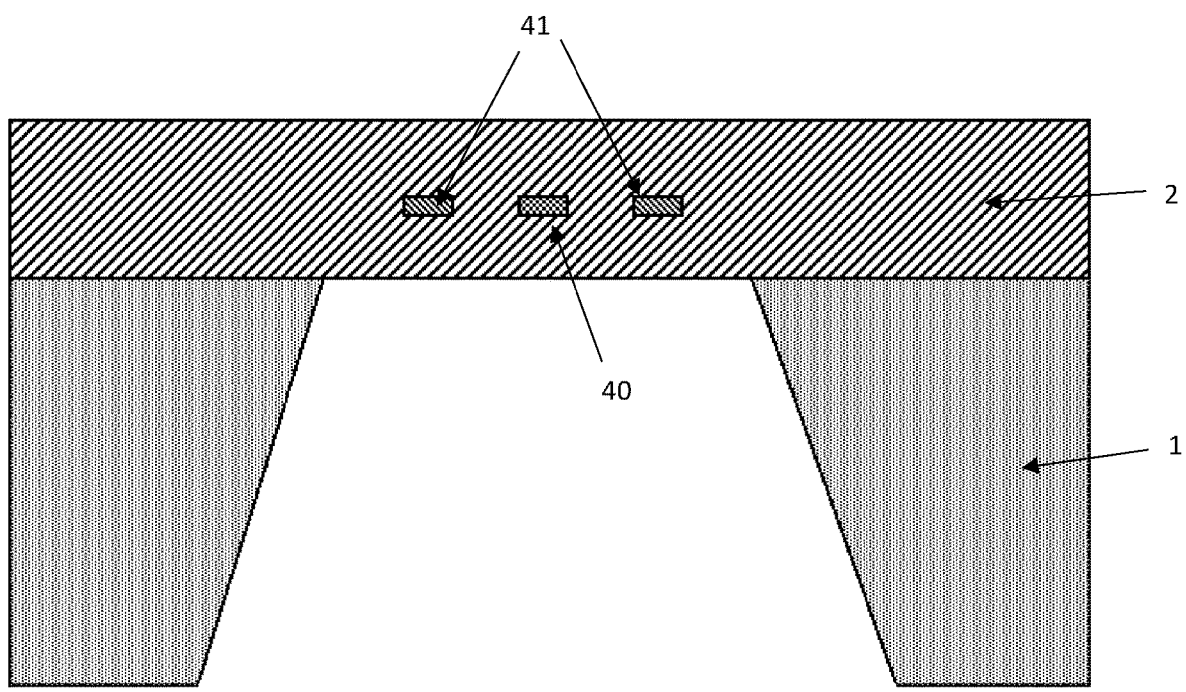
FIG. 2B illustrates schematically a cross-section of a flow sensor chip which can be used in a flow sensor chip package, in which the dielectric membrane includes additional sensing elements, according to an embodiment of the disclosure.

FIG. 2B illustrates schematically a cross-section of a flow sensor chip which can be used in a flow sensor chip package, in which the dielectric membrane includes additional sensing elements, according to an embodiment of the disclosure. FIG. 2B shows another example of a flow sensor chip, this one having additionally two sensing elements 41. Similar to the heater, these can be made of any material such as tungsten, aluminium, platinum, polysilicon, single crystal silicon or titanium. They could also be a diode or a transistor. In other embodiments, the sensing elements can also be thermopiles.

Figure 2C:
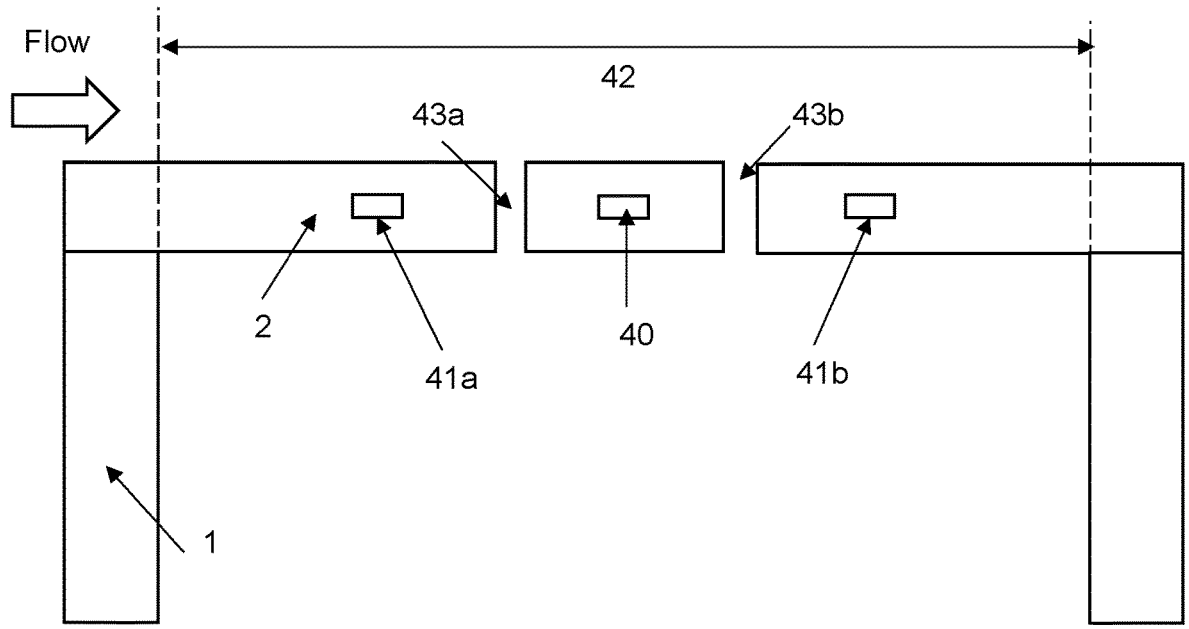
FIG. 2C illustrates schematically a cross-section of a flow sensor chip which can be used in a flow sensor chip package, in which the dielectric membrane includes discontinuities, according to an embodiment of the disclosure.
Figure 2D:
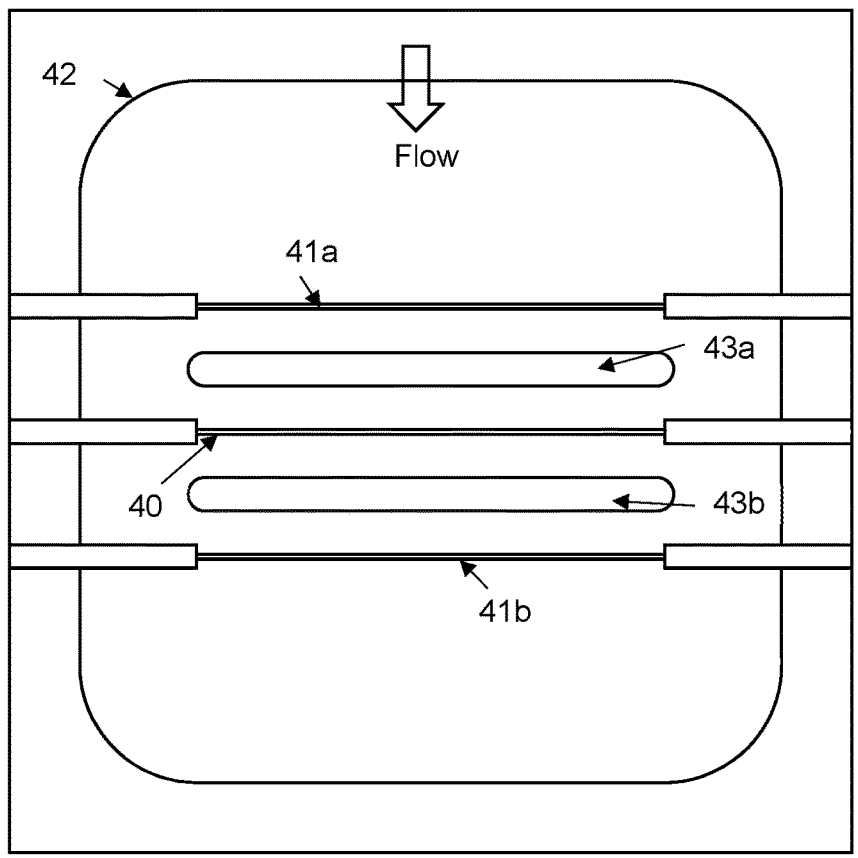
FIG. 2D illustrates schematically a top view of the flow sensor chip of FIG. 2C, according to an embodiment of the disclosure.

FIG. 2C illustrates schematically a cross-section of a flow sensor chip which can be used in a flow sensor chip package, in which the dielectric membrane includes discontinuities, and FIG. 2D illustrates schematically a top view of the flow sensor chip of FIG. 2C, according to an embodiment of the disclosure.

The device has a semiconductor substrate 1, a dielectric layer or dielectric region 2 suspended on or over an etched area defining the dielectric membrane 42, and a heater or heating element 40. The heating element 40 extends in a direction substantially perpendicular to the direction of flow through the sensor, although other geometries are possible. When the fluid passes over the top of the membrane 42, the heater 40 cools down due to heat convention losses.

In this embodiment, there are two temperature sensing elements 41a (upstream) and 41b (downstream), placed symmetrically on opposing sides of the heater. The two temperature sensing elements may be considered further sensing elements as the heating element itself can act a sensing element. The two sensing elements could be made of the same material as the heater (e.g. Tungsten, polysilicon, platinum, Aluminium) or could be a different material with a stable and relatively high temperature coefficient of resistance (TCR). Alternatively, diodes or thermopiles could be used for the sensing elements. The two sensing elements may measure a differential across the heating element.

Discontinuities (in this embodiment holes) 43a and 43b through the membranes (processed optionally by front etching) are placed in a symmetrical way. The holes minimise the thermal conduction path through the dielectric membrane, forcing more heat to dissipate via convection and conduction through the environment. The presence of the holes also helps to reduce the power consumption of the device (for the same heater temperature), because of the reduction in the total heat losses. Furthermore, the holes help to reduce the thermal response time (increase the speed at which the heater heats up when supplied with an electrical power pulse) due to the decrease in the thermal mass of the membrane. In this embodiment, the holes are elongate slot extending towards opposite edges of the dielectric membrane.

As with the embodiments shown in FIGS. 2A and 2B, the change in the resistance of the heater 40 is associated with the flow rate, speed, volume or mass flow rates. Alternatively, the heater 40 could be maintained in a constant temperature or constant resistance mode by modifying the power supplied to the heater element. In this case, one can measure the change in the power due to the flow rate, velocity, volume or mass flow rates. In the presence of the flow, 41b (the downstream sensing element) sees a higher temperature than 41a (the upstream sensing element), as in FIG. 2B. The temperature difference between 41b and 41a increases with the flow rate (or flow velocity). In the example of sensing the CO2 concentration in air, given the fact that CO2 has a lower thermal conductivity than air, less heat will dissipate through the environment making the increase in the temperature between 41*b* and 41*a* less for a given flow rate. One can associate the change in the differential temperature between the two temperature sensing elements 41*b* and 41*a* with the CO2 concentration in air for a given flow rate (which can be measured by the heater itself 40).

The opposite effect occurs if a certain concentration of hydrogen is present in the air. Hydrogen has a higher thermal conductivity than air and therefore the increase in the temperature between 41*b* and 41*a* will be higher for a given flow rate.

The temperature difference could be translated in a voltage difference or resistance difference, depending on the temperature sensing element employed. For diodes supplied with constant current, or for thermopiles, the voltage difference is appropriate. For resistive temperature detectors, several read-out techniques could be employed such as using instrumentation bridges or using current mirrors and sensing the voltage difference.

Figure 3:
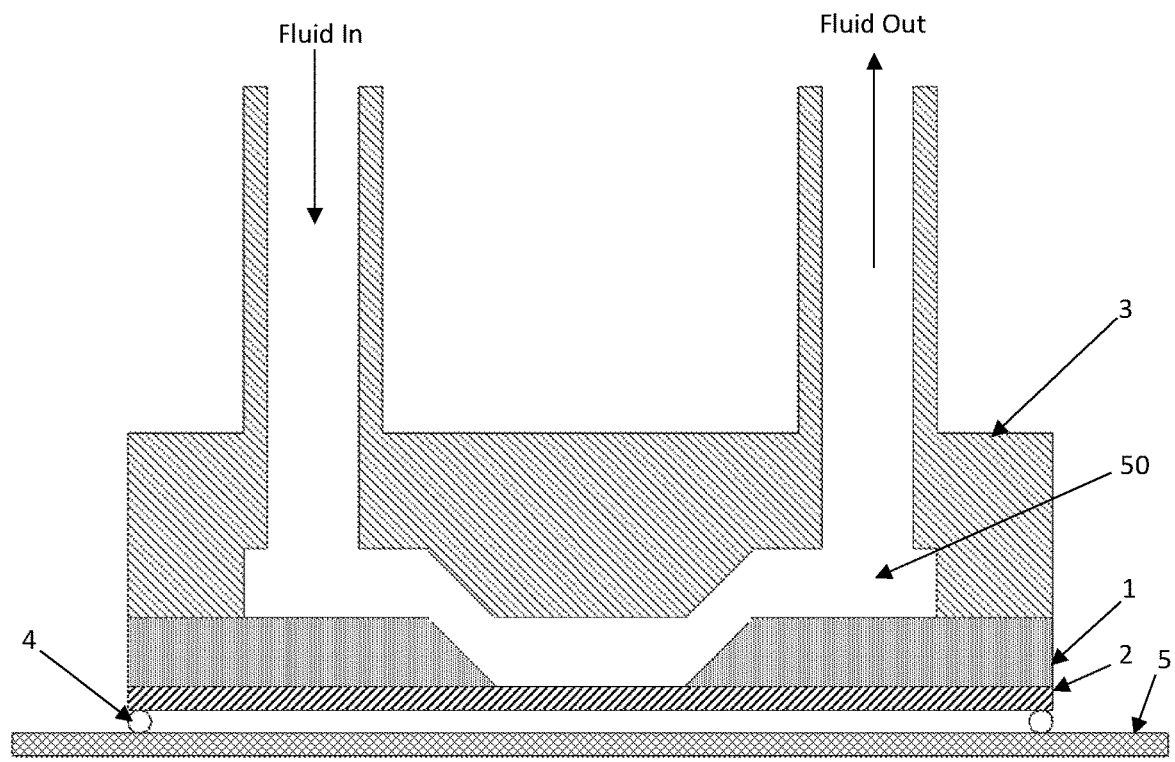
FIG. 3 illustrates schematically a cross-section of a flow sensor in a chip scale package, in which the inlet channel and outlet channel have a straight connection, according to an embodiment of the disclosure.

FIG. 3 illustrates schematically a cross-section of a flow sensor in a chip scale package, in which the inlet channel and outlet channel have a straight connection, according to an embodiment of the disclosure. In this embodiment, the inlets and outlets have a straight connection instead of a barbed connection.

Figure 4:
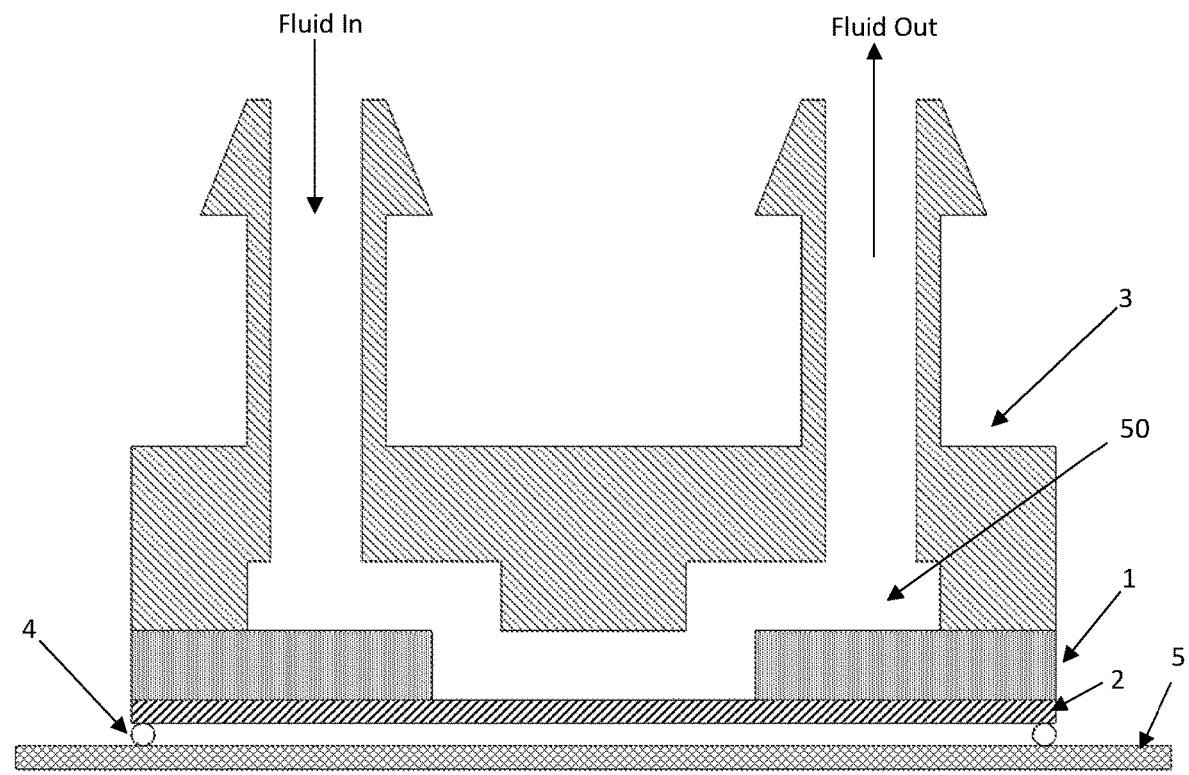
FIG. 4 illustrates schematically a cross-section of a flow sensor in a chip scale package, in which the etched cavity of the first substrate has vertical sidewalls, according to an embodiment of the disclosure.

FIG. 4 illustrates schematically a cross-section of a flow sensor in a chip scale package, in which the etched cavity of the semiconductor substrate has vertical sidewalls, according to an embodiment of the disclosure. In this embodiment, the cavity within the semiconductor substrate had vertical side walls that are perpendicular to a lower surface of the sensing channel. Such a shape is possible by the use of DRIE while back etching.

Figure 5:
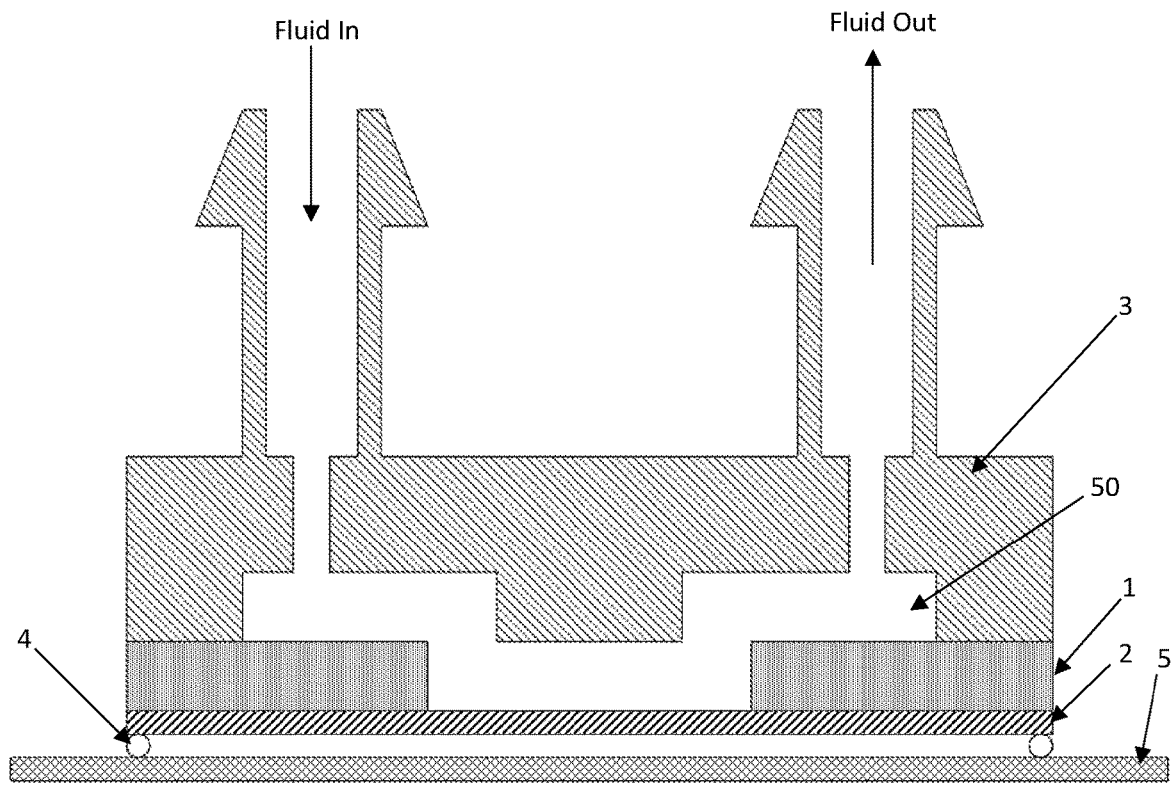
FIG. 5 illustrates schematically a cross-section of a flow sensor in a chip scale package, in which there is a restrictor within the sensing channel, according to an embodiment of the disclosure.

FIG. 5 illustrates schematically a cross-section of a flow sensor in a chip scale package, in which there is a restrictor within the sensing channel, according to an embodiment of the disclosure. The restrictor is a narrowing of part of the flow channel, and helps to make the flow more independent of outside connections. In this embodiment, the restrictor is located just below the inlet/outlets. The figure shows one possible location for the restrictor, but it is possible to place it in other locations within the channel as well.

Figure 6:
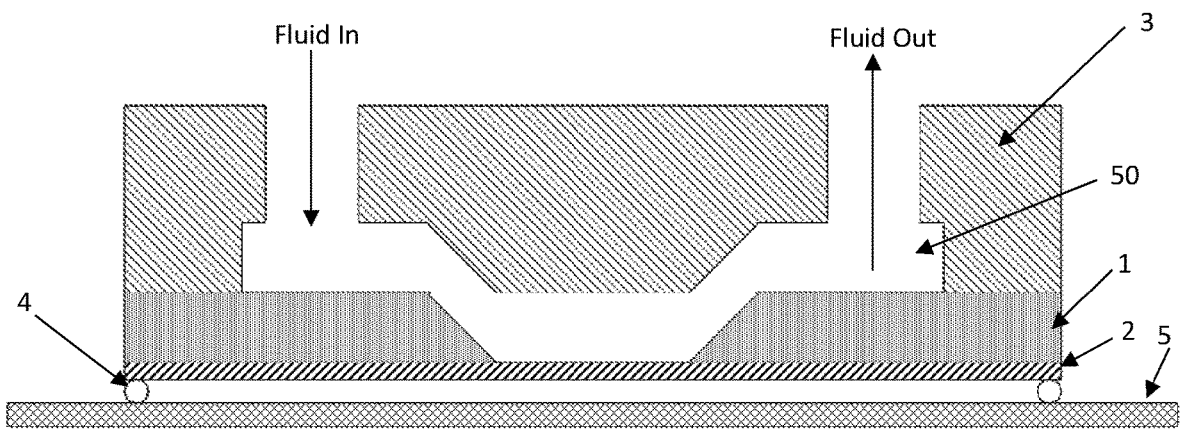
FIG. 6 illustrates schematically a cross-section of a flow sensor in a chip scale package, in which the inlet channel and the outlet channel are formed only of openings within the second substrate, according to an embodiment of the disclosure.

FIG. 6 illustrates schematically a cross-section of a flow sensor in a chip scale package, in which the inlet channel and the outlet channel are formed only of openings (apertures) within the second substrate, according to an embodiment of the disclosure. In this embodiment, there are no protruding connections for the inlet and outlet, but just an opening or aperture within the second substrate. In other words, the second substrate has flat top surface with the inlet channel and outlet channel terminating at the flat surface of the second substrate. Such a system can be used for example to attach the device to a microfluidic chip, such as a micropump or a microvalve. Alternatively, it is placed within a large flow channel, some of the fluid will still flow within the sensor package allowing a measurement to be made.

Figure 7:
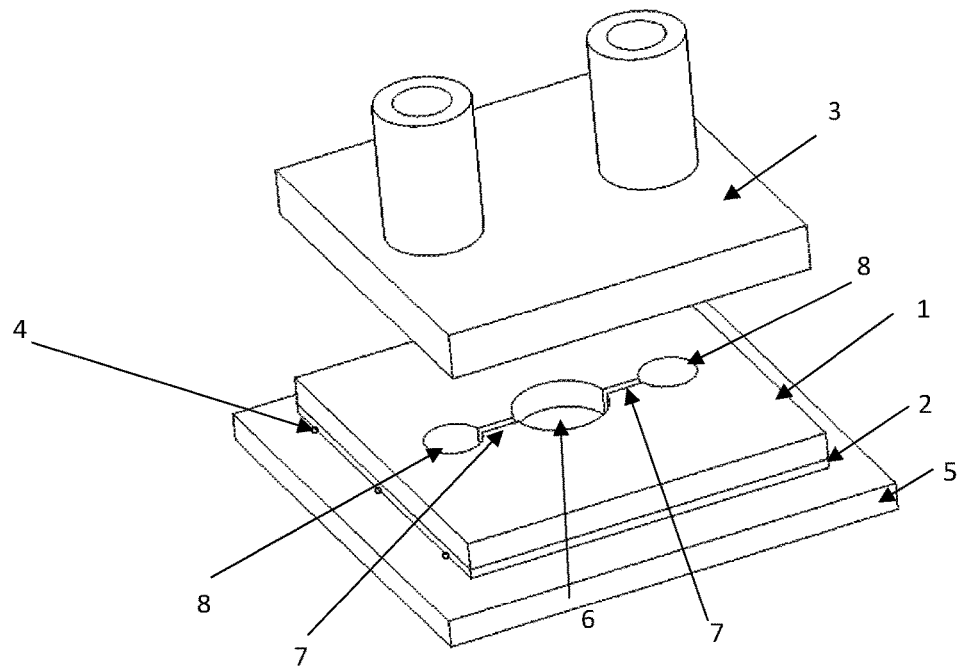
FIG. 7 shows schematically a 3D exploded view of a chip scale flow sensor package with the semiconductor region including multiple etched cavities connected by thin connecting channels to form the sensing channel.

FIG. 7 shows schematically a 3D exploded view of a chip scale flow sensor package with the semiconductor region including multiple etched cavities fluidly connected by thin connecting channels (slits) to form the sensing channel. FIG. 7 shows an alternate design of the invention. In this embodiment, the semiconductor substrate is etched by DRIE to form a large circular cavity 6, two thin channels 7, and two more circular cavities 8 that form the channel interface with the second substrate 3. The two circular cavities join the flow inlet channel and the flow outlet channel located through and within the second substrate. There are of course many more variations and shapes of cavities and connecting channels, and this figure just highlights one alternate arrangement.

Figure 8:
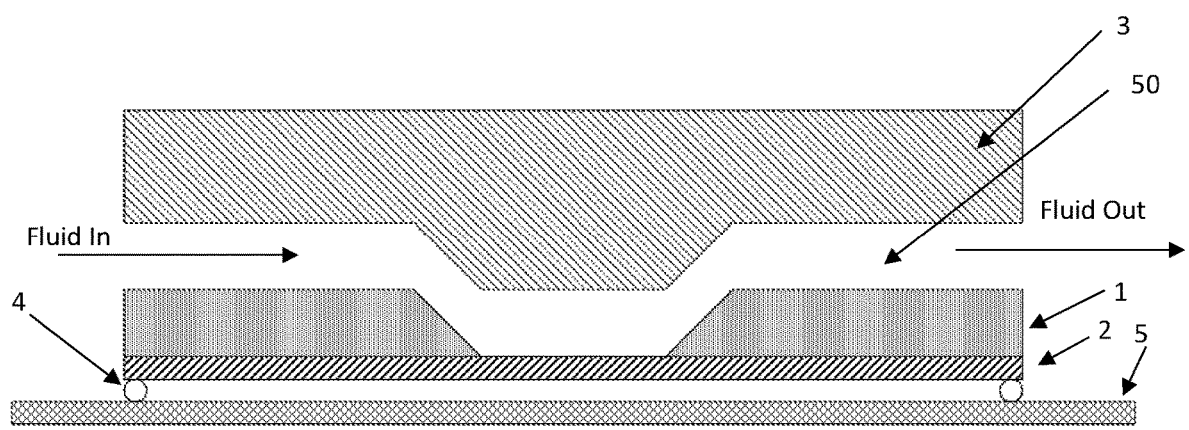
FIG. 8 illustrates schematically a cross-section of a flow sensor in a chip scale package, in which the inlet channel and the outlet channel are formed on opposing sides of the device between the first substrate and the second substrate, according to an embodiment of the disclosure.

FIG. 8 illustrates schematically a cross-section of a flow sensor in a chip scale package, in which the inlet channel and the outlet channel are formed on opposing or opposite sides of the device between the semiconductor substrate and the second substrate, according to an embodiment of the disclosure. In this fluid flow sensor package arrangement, the inlet and outlets are on the sides of the device. In this embodiment, the shapes of the semiconductor substrate and the second substrate cooperate to form the flow inlet channel and the flow outlet channel. Connections to this can be made by attaching a micro-fluidic chip to the side. Alternatively, the device can be placed within a larger fluid channel, and some of the fluid will flow through the device.

Figure 9:
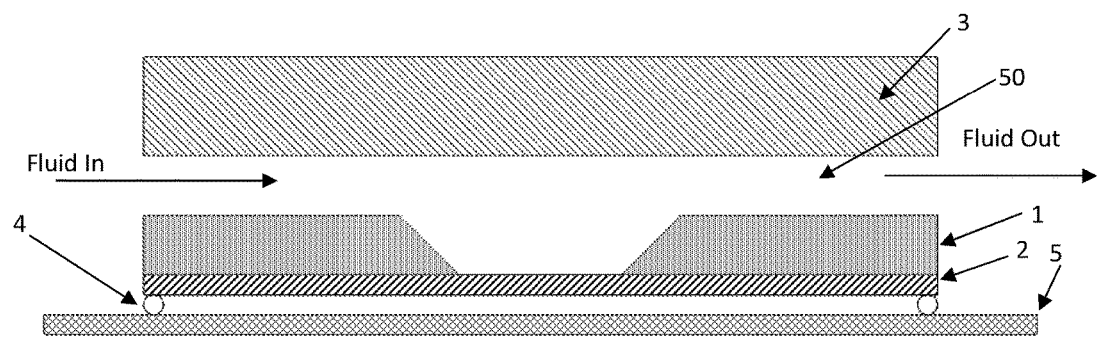
FIG. 9 illustrates schematically a cross-section of a flow sensor in a chip scale package, in which the second substrate has a flat lower surface without a protrusion into the sensing channel, according to an embodiment of the disclosure.

FIG. 9 illustrates schematically a cross-section of a flow sensor in a chip scale package, in which the second substrate has a flat lower surface without a protrusion into the sensing channel, according to an embodiment of the disclosure. In this embodiment, the second substrate 3 does not have a protrusion corresponding to the cavity in the semiconductor substrate, and therefore a top surface of the sensing channel is flat. The second substrate comprises a planar substrate sheet with two opposing parallel flat surfaces, where one of the surfaces is adjacent to the sensing channel, the flow inlet channel and the flow outlet channel. This makes the design of the second substrate easier, and still allows the fluid flow to be in contact with the membrane allowing flow measurement.

Figure 10:
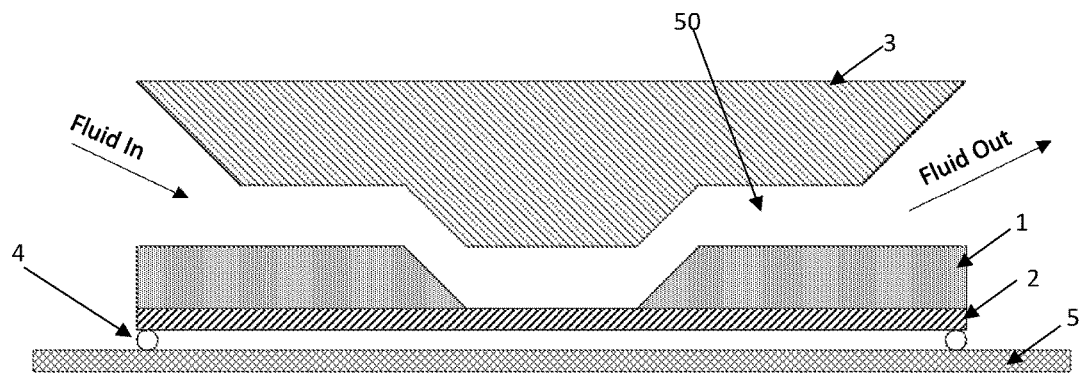
FIG. 10 illustrates schematically a cross-section of a flow sensor in a chip scale package, in which the inlet channel and outlet channel have wider openings, according to an embodiment of the disclosure.

FIG. 10 illustrates schematically a cross-section of a flow sensor in a chip scale package, in which the inlet channel and outlet channel have wider openings, according to an embodiment of the disclosure. FIG. 10 shows a fluid flow sensor package where compared to FIG. 9, the inlet and outlet have wider openings, extending to the top of the package. The flow inlet channel and the flow outlet channel have a larger cross-section at a peripheral end than at an end closest to the sensing channel. Such a design is particularly suited to be placed within a larger flow channel, for example a large gas or water pipe.

Figure 11:
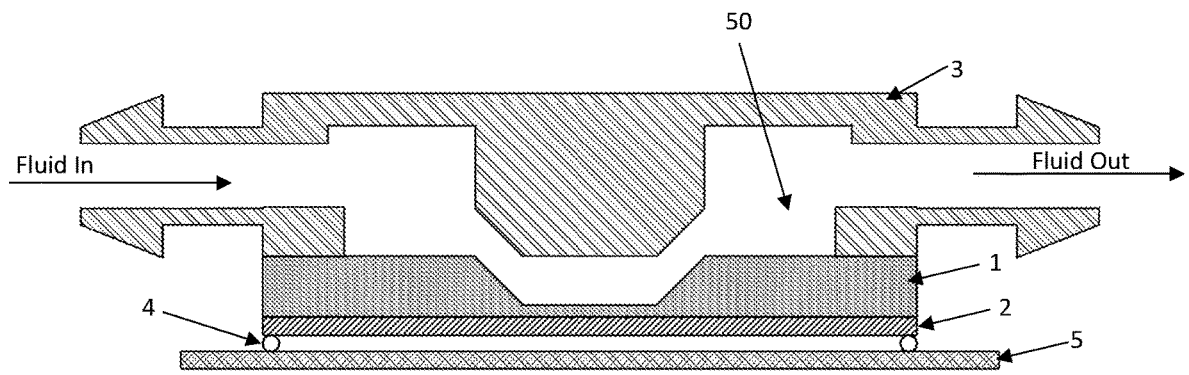
FIG. 11 illustrates schematically a cross-section of a flow sensor in a chip scale package, in which the inlet channel and outlet channel are on opposing sides of the device and each have a barbed connection, according to an embodiment of the disclosure.

FIG. 11 illustrates schematically a cross-section of a flow sensor in a chip scale package, in which the inlet channel and outlet channel are on opposing sides of the device and each have a barbed connection, according to an embodiment of the disclosure. FIG. 11 shows a fluid flow sensor package with another arrangement of the inlet and outlet channels, where the inlet and outlet are on the sides of the package, and also include barbed connections to allow connection by tubing. In this embodiment, the inlet channel and outlet channel are formed only by apertures through the second substrate rather than the space between the second substrate and the semiconductor substrate, however the barbed connection on opposing sides could be used in any embodiment.

Figure 12:
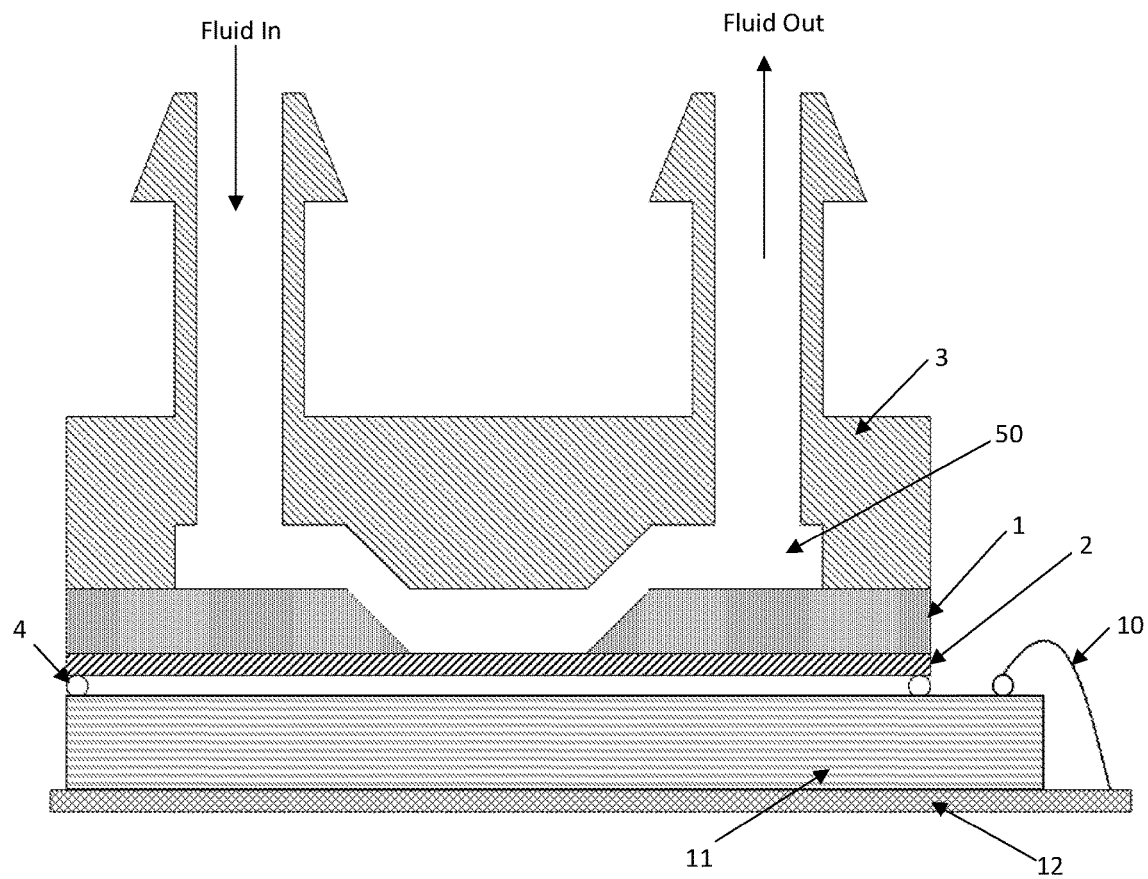
FIG. 12 illustrates schematically a cross-section of a flow sensor chip scale package with an ASIC chip as part of the package, according to an embodiment of the disclosure.

FIG. 12 illustrates schematically a cross-section of a flow sensor chip scale package with an ASIC chip as part of the package, according to an embodiment of the disclosure. In this embodiment, the connection substrate is another semiconductor chip 11 instead of a PCB material. The connection substrate is an ASIC chip to control and read out from the sensor. The chip may circuitry including a heater drive, an amplifier, a digital to analog converter, an analog to digital convertor, a temperature sensor, and/or circuitry to communicate wirelessly or by wire. The connection semiconductor chip 11 is attached to a PCB 12, and connections made by bond wires 10.

Figure 13:
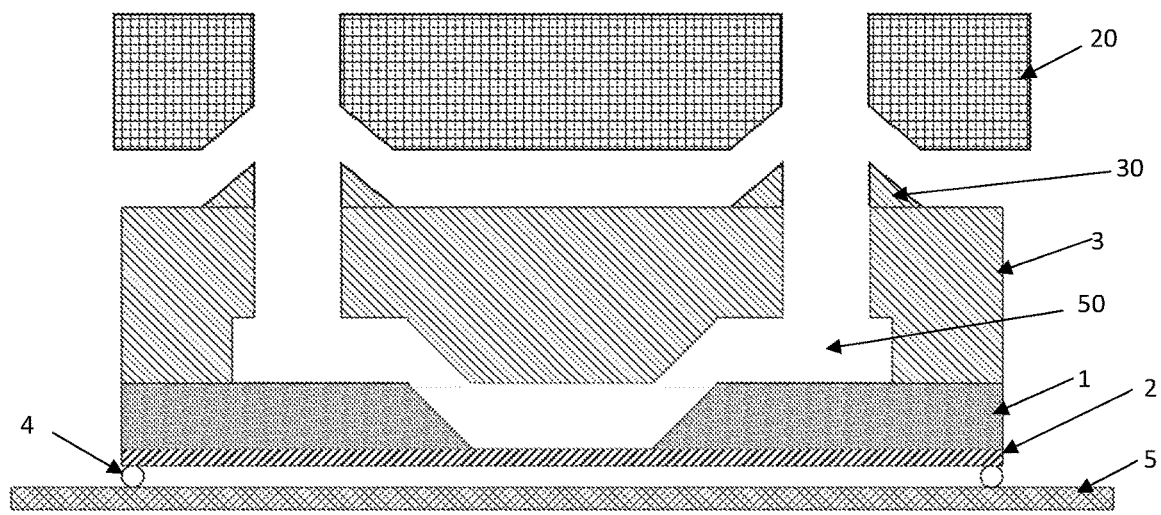
FIG. 13 illustrates schematically a cross-section of a flow sensor chip scale package where the inlet channel and outlet channel have a small protrusions or grooves on the surface of the second substrate that correspond to a system interface that they are connected to, according to an embodiment of the disclosure.

FIG. 13 illustrates schematically a cross-section of a flow sensor chip scale package where the inlet channel and outlet channel have small protrusions or grooves on the surface of the second substrate that correspond to a system interface that they are connected to. FIG. 13 shows a fluid flow sensor package, where the inlets and outlets do not have a connecting tube, but have small protrusions or grooves 30 on the surface. These are designed such that they allow a coupled connection with another device 20. The device 20 can be a microfluidic channel, or part of a larger flow channel system, or include a microvalve and/or micropump. The device 20 may also be two devices instead of one, where one device connects to the inlet, and the other connects to the outlet. To make a good connection, an adhesive or sealant may also be used in addition to the coupled protrusions and indentations. It should be noted that many various shapes and schemes of protrusions/indentations are possible.

Figure 14:
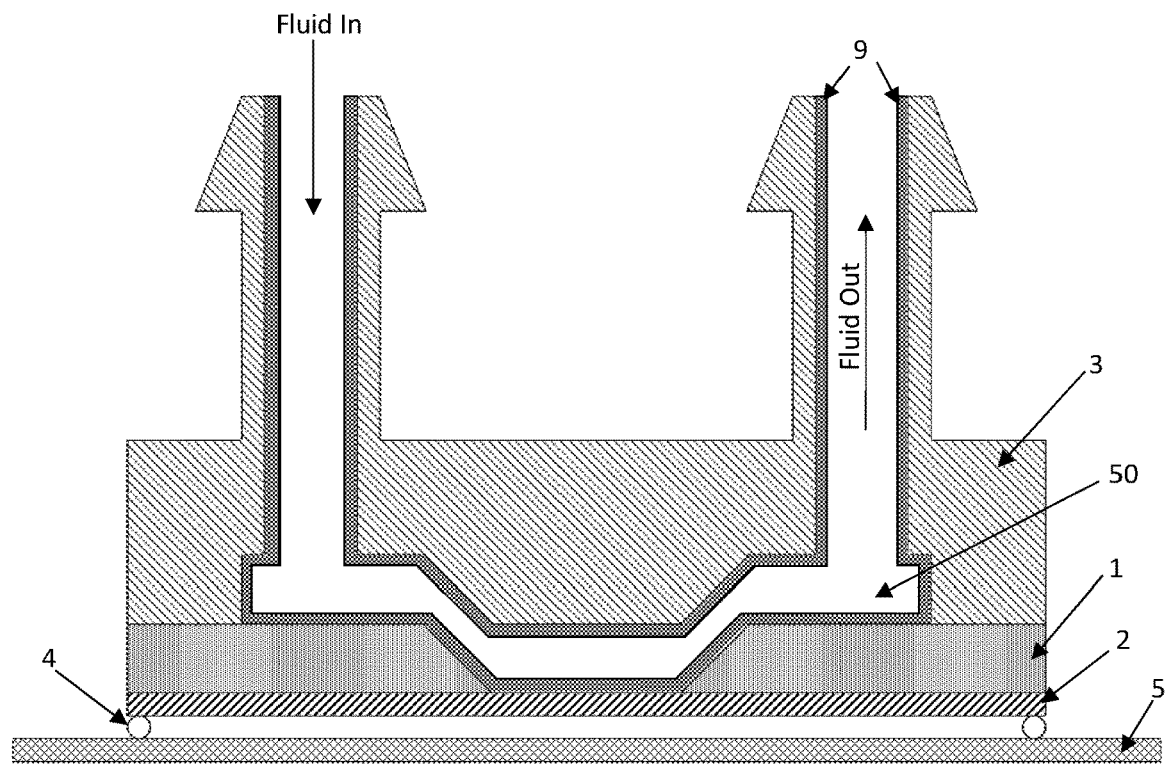
FIG. 14 illustrates schematically a cross-section of a flow sensor chip scale package, where the flow channel has a protective coating, according to an embodiment of the disclosure.

FIG. 14 illustrates schematically a cross-section of a flow sensor chip scale package, where the flow channel has a protective coating, according to an embodiment of the disclosure. FIG. 14 shows a fluid flow sensor package where the channel walls (the sensing channel, the flow inlet channel, and the flow outlet channel) are all coated with a protective material 9. Such a material would be particularly useful when using the device with liquids. The material can stop the corrosion of the flow channel walls. The material may also be there to make the sensor and flow channel walls bio compatible with the flowing liquid. The protective material may include more than one layer and type of material to give different kinds of protection. The protective material can comprise a group of parylene, PTFE (poly tetra fluoro ethylene) or silicon dioxide.

Figure 15:
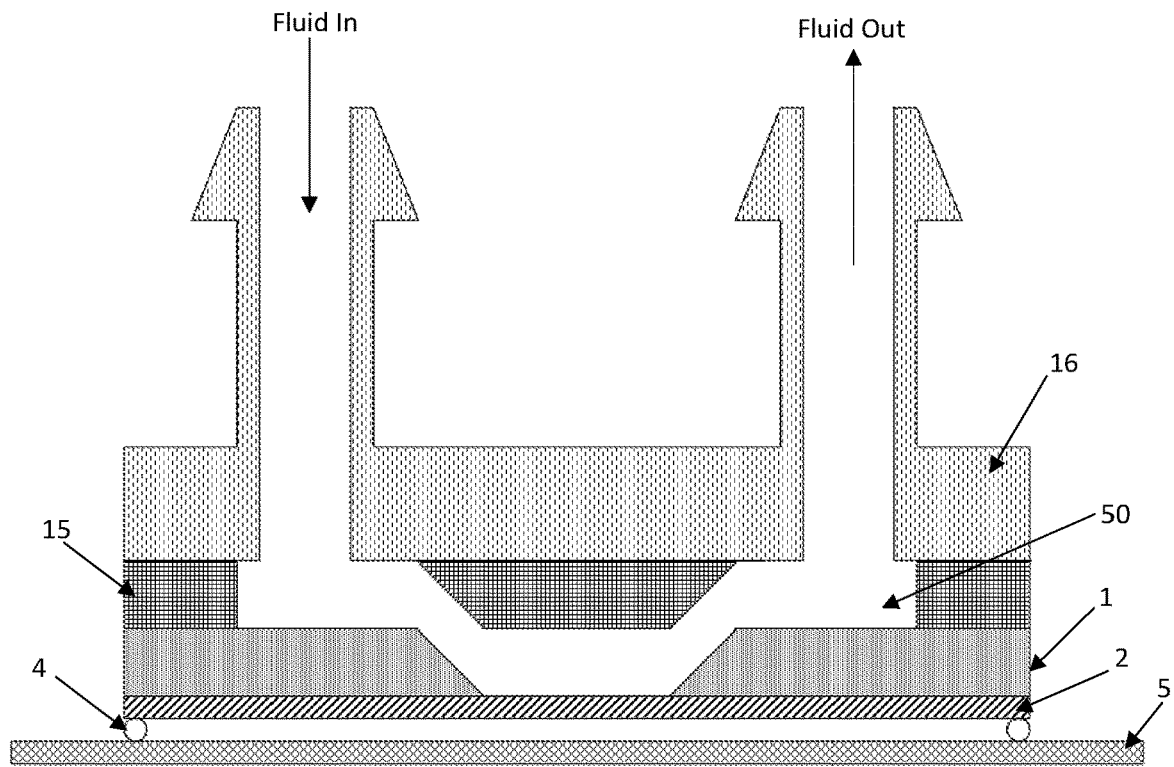
FIG. 15 illustrates schematically a cross-section of a flow sensor chip scale package where the second substrate is formed of another semiconductor material such as silicon, with a further substrate attached to the second substrate, according to an embodiment of the disclosure.

FIG. 15 illustrates schematically a cross-section of a flow sensor chip scale package where the second substrate is formed of another semiconductor material such as silicon, with a further substrate attached to the second substrate, according to an embodiment of the disclosure. FIG. 15 shows a fluid flow sensor package where the second substrate is another semiconductor such as silicon 15. However, it is also possible to have a similar configuration where the second substrate is moulded plastic. In this case, the semiconductor can be micromachined to form the channel and be attached to the first semiconductor substrate 1. Further, a third substrate 16 is attached to the opposite side of the second substrate than the sensing channel, to form barbed inlet and outlet connections. The third substrate can be a moulded plastic material. It should be noted that it is possible to make the sensor package with the second substrate as a semiconductor, but without a third substrate, in which case the design will be similar to that in FIG. 6, except that the second substrate would be a semiconductor instead of moulded plastic. Further, a third substrate of a semiconductor can also be used to achieve a further design similar to FIG. 6. In a similar manner many different combinations of materials are possible for the substrates in this figure, and also in other figures. Materials other than a semiconductor or moulded plastic are also possible, such as glass, sapphire, or a metal.

Figure 16:
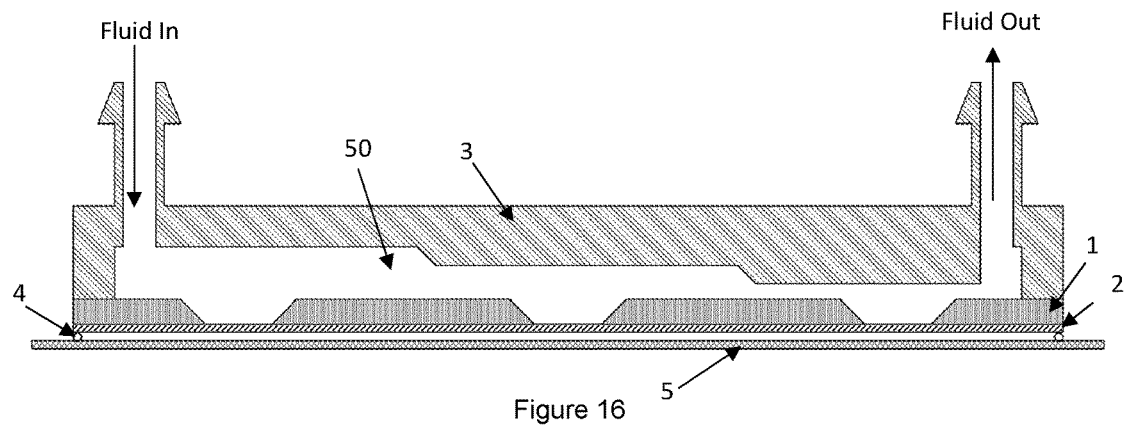
FIG. 16 illustrates schematically a cross-section of a flow sensor chip scale package with multiple flow sensors on separate dielectric membranes within the chip, each with a different sensing channel height; according to an embodiment of the disclosure.

FIG. 16 illustrates schematically a cross-section of a flow sensor chip package with multiple flow sensors on separate dielectric membranes within the chip, each with a different sensing channel height; according to an embodiment of the disclosure. FIG. 16 shows a fluid sensor package where the flow sensor chip has an array of sensors—each flow sensor corresponding to a dielectric membrane over an etched portion of the semiconductor substrate 1. Each flow sensor may include one or more sensing elements. The second substrate 3 is designed such that the height of the channel above each sensor is different. This allows measurement of different ranges of flows rates.

Figure 17:
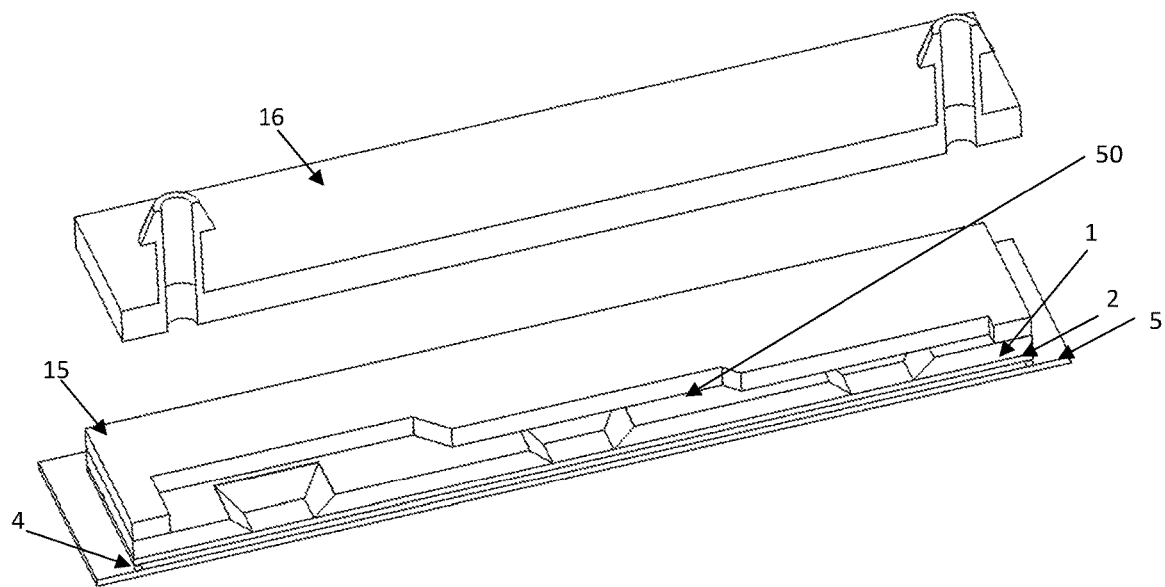
FIG. 17 shows schematically a 3D exploded view of a flow sensor chip scale package with multiple flow sensors on separate dielectric membranes within the chip each with a different channel width, according to an embodiment of the disclosure.

FIG. 17 shows schematically a 3D exploded view of a flow sensor chip package with multiple flow sensors on separate dielectric membranes within the same chip, each with a different channel width, according to an embodiment of the disclosure. FIG. 17 shows a fluid sensor where the flow sensor chip has an array of flow sensors, and the channel has a different width at each flow sensor as the dielectric membranes have different areas. Such a sensor package also allows measurement of different flow ranges, similar to the design in FIG. 16, except that the variation in channel cross-section is achieved by changing the channel width, rather than channel height.

Figure 18:
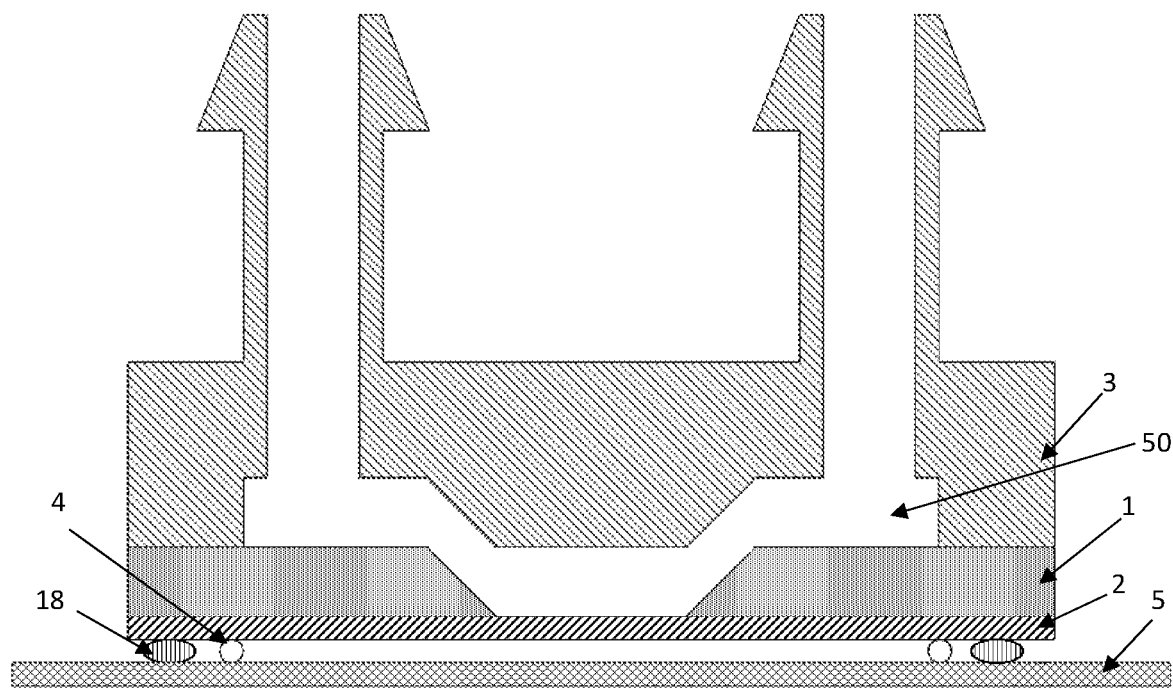
FIG. 18 illustrates schematically a cross-section of a flow sensor chip scale package in which a sealant is applied between the flow sensor chip and the connection substrate, according to an embodiment of the disclosure.

FIG. 18 illustrates schematically a cross-section of a flow sensor chip scale package in which a sealant 18 is applied between the flow sensor chip and the connection substrate, according to an embodiment of the disclosure. This forms an airtight seal, so that if there are holes in the membrane, then the fluid cannot escape out the sensor.

Figure 19:
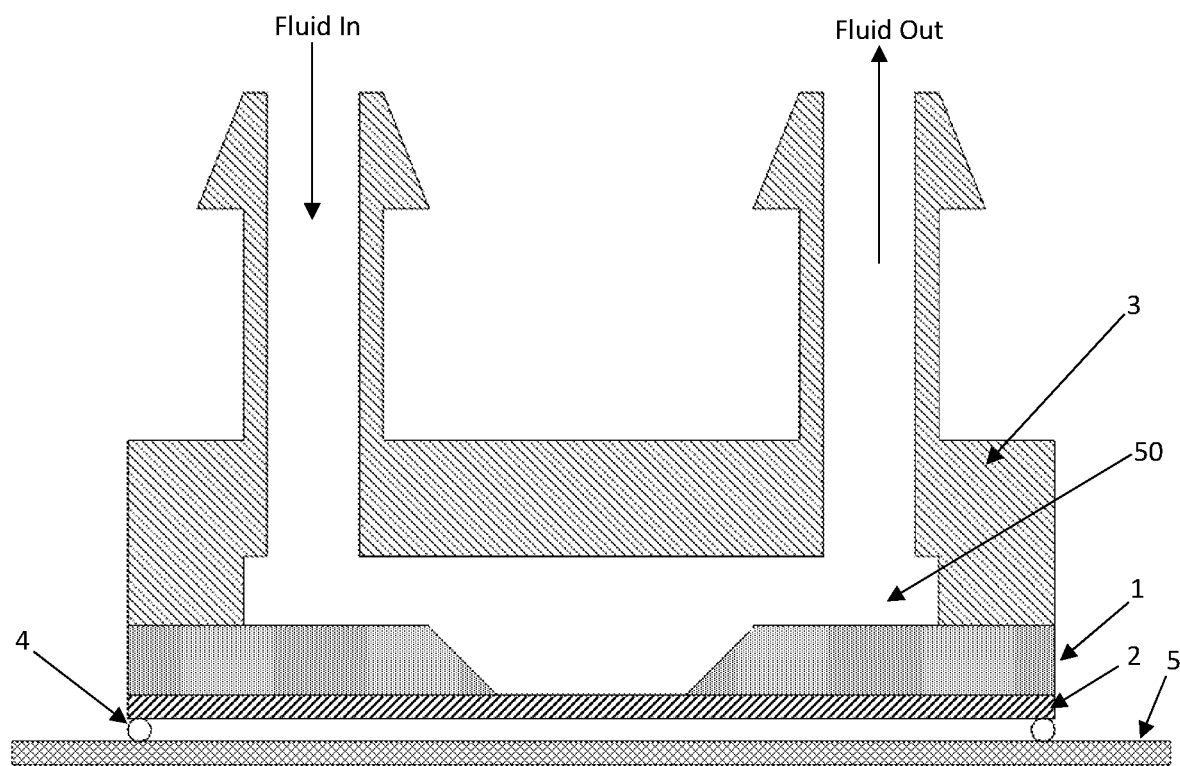
FIG. 19 illustrates schematically a cross-section of a flow sensor chip scale package where the second substrate (or the lid of the package) has a flat lower surface without a protrusion into the sensing channel, according to an embodiment of the disclosure.

FIG. 19 illustrates schematically a cross-section of a flow sensor chip scale package where the second substrate (or the lid of the package) has a flat lower surface without a protrusion into the sensing channel. In this embodiment, the second substrate 3 is designed such that it doesn't have a protrusion into the sensing channel, as in the previous figures. This gives a larger cross-section for the sensing channel 50.

The skilled person will understand that in the preceding description and appended claims, positional terms such as 'above', 'overlap', 'under', 'lateral', etc. are made with reference to conceptual illustrations of an device, such as those showing standard cross-sectional perspectives and those shown in the appended drawings. These terms are used for ease of reference but are not intended to be of limiting nature. These terms are therefore to be understood as referring to a device when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the disclosure, whether alone or in any appropriate combination with any other feature disclosed or illustrated herein.

The invention claimed is:
1. A flow sensor comprising:
a first substrate comprising an etched portion, wherein the etched portion extends towards a first side of the first substrate from a second side of the first substrate, wherein the first side of the first substrate and the second side of the first substrate are opposite sides;
a dielectric region located on the first side of the first substrate, wherein the dielectric region comprises at least one dielectric membrane located over the etched portion of the first substrate;
a fluid flow sensor located on or within the dielectric membrane;

a second substrate adjoining the second side of the first substrate, wherein the first substrate and the second substrate cooperate to form a sensing channel through the flow sensor, and wherein the second substrate comprises a protrusion extending towards the dielectric membrane, wherein at least one region of the second substrate that is adjacent to the protrusion is substantially parallel to the second side of the first substrate; and a flow inlet channel forming a first portion of the sensing channel and a flow outlet channel forming a second portion of the sensing channel, wherein the second substrate comprises two opposing surfaces, and wherein one of the opposing surfaces is adjacent to the sensing channel, the flow inlet channel and the flow outlet channel, and wherein the flow inlet channel and the flow outlet channel are formed at a boundary between the first substrate and the second substrate.

2. The flow sensor according to claim 1, further comprising electrical connections on an outer surface of the dielectric region.

3. The flow sensor according to claim 1, wherein the etched portion of the first substrate has sloped side walls.

4. The flow sensor according to claim 1, wherein the second substrate is configured such that a top surface of the sensing channel is substantially flat.

5. The flow sensor according to claim 1, wherein the first substrate and the second substrate are configured such that one or both of the flow inlet channel and the flow outlet channel have a larger cross-section at a peripheral end than at an end closest to the sensing channel.

6. The flow sensor according to claim 1, wherein the sensing channel comprises a protective coating, and the second substrate is formed of a semiconductor material.

7. The flow sensor according to claim 1, further comprising a third substrate adjoined to the second substrate on an opposite side of the second substrate to the sensing channel.

8. The flow sensor according to claim 1, wherein the etched portion of the first substrate defines at least two etched cavities and one or more connecting channels, and wherein the etched cavities are fluidly connected to each other by the one or more connecting channels.

9. The flow sensor according to claim 8, wherein the dielectric region comprises at least two dielectric membranes corresponding to the at least two etched cavities; and
wherein the dielectric region comprises a plurality of sensing elements, wherein each of the plurality of sensing elements is formed within a separate dielectric membrane.

10. The flow sensor according to claim 9, wherein the at least two dielectric membranes have different areas, wherein the sensing channel comprises a plurality of sensing channel regions each corresponding to one or more of the plurality of sensing elements, and wherein each of the plurality of sensing channel regions has a different cross-section.

11. The flow sensor according to claim 1, wherein the flow sensor comprises a heating element located within the dielectric membrane, and the dielectric membrane comprises one or more discontinuities located between the heating element and an edge of the dielectric membrane.

12. The flow sensor according to claim 1, wherein a connection substrate comprises a printed circuit board (PCB) material, and wherein the connection substrate comprises a semiconductor chip, and the semiconductor chip comprises integrated circuitry.

13. A method of manufacturing a flow sensor, the method comprising:
forming a first substrate comprising an etched cavity portion, wherein the etched cavity portion extends towards a first side of the first substrate from a second side of the first substrate, wherein the first side of the first substrate and the second side of the first substrate are opposite sides;
forming a dielectric region located on the first side of the first substrate, wherein the dielectric region comprises at least one dielectric membrane located over an etched portion of the first substrate;
forming the flow sensor located on or within the dielectric membrane; and
forming a second substrate adjoining the second side of the first substrate, wherein the first substrate and the second substrate cooperate to form a sensing channel through the flow sensor, wherein the second substrate comprises a protrusion extending towards the dielectric membrane, wherein at least one region of the second substrate that is adjacent to the protrusion is substantially parallel to the second side of the first substrate; and
wherein the second substrate comprises two opposing surfaces, and wherein a flow inlet channel forming a first portion of the sensing channel and a flow outlet channel forming a second portion of the sensing channel, are formed at a boundary between the first substrate and the second substrate, and wherein one of the opposing surfaces is adjacent to the sensing channel, the flow inlet channel and the flow outlet channel.

14. The flow sensor according to claim 1, further comprising a sealant between the dielectric region and a connection substrate.

15. The flow sensor according to claim 1, further comprising a connection substrate electrically connected to bond pads on an exterior surface of the dielectric region.

16. The flow sensor according to claim 15, wherein the connection substrate is electrically connected to the bond pads using solder balls, or bumps or pillars formed of copper or gold.

17. The flow sensor according to claim 1, wherein the protrusion extends in a direction substantially perpendicular to the flow inlet channel and the flow outlet channel.

18. The flow sensor according to claim 1, wherein the protrusion has substantially a same width in a direction parallel to the sensing channel as a width of the etched portion of the first substrate.

19. The flow sensor according to claim 1, wherein the etched portion of the first substrate and the protrusion of the second substrate cooperate to form the sensing channel through the flow sensor.

* * * * *

UNITED STATES PATENT AND TRADEMARK OFFICE
CERTIFICATE OF CORRECTION

PATENT NO. : 11,965,762 B2
APPLICATION NO. : 16/658725
DATED : April 23, 2024
INVENTOR(S) : Syed Zeeshan Ali et al.

Page 1 of 4

It is certified that error appears in the above-identified patent and that said Letters Patent is hereby corrected as shown below:

On the Title Page

Please delete the Title Page and insert the Title Page shown on the attached Title Page.

In the Claims (Column 16, Line 55 to Column 18, Line 58), Claims 1-19 should be replaced with the following listing of Claims 1-24:

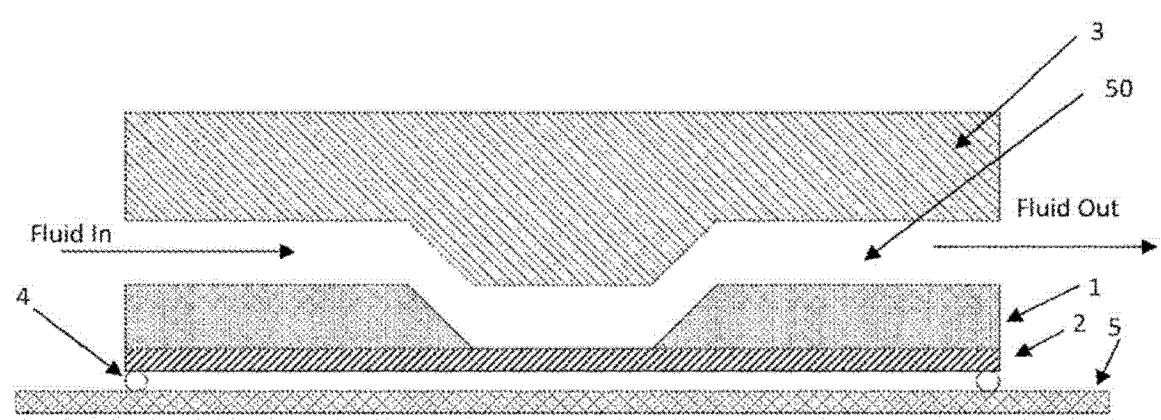

The invention claimed is:
1. A flow sensor comprising:
a first substrate comprising an etched portion, wherein the etched portion extends towards a first side of the first substrate from a second side of the first substrate, wherein the first side of the first substrate and the second side of the first substrate are opposite sides;
a dielectric region located on the first side of the first substrate, wherein the dielectric region comprises at least one dielectric membrane located over the etched portion of the first substrate;
a fluid flow sensor located on or within the dielectric membrane;
a second substrate adjoining the second side of the first substrate, wherein the first substrate and the second substrate cooperate to form a sensing channel through the flow sensor, and wherein the second substrate comprises a protrusion extending towards the dielectric membrane, wherein at least one region of the second substrate that is adjacent to the protrusion is substantially parallel to the second side of the first substrate; and a flow inlet channel forming a first portion of the sensing channel and a flow outlet channel forming a second portion of the sensing channel, wherein the second substrate comprises two opposing surfaces, and wherein one of the opposing surfaces is adjacent to the sensing channel, the flow inlet channel and the flow outlet channel, and wherein the flow inlet channel and the flow outlet channel are formed at a boundary between the first substrate and the second substrate.

2. The flow sensor according to claim 1, further comprising electrical connections on an outer surface of the dielectric region.

Signed and Sealed this
First Day of October, 2024

Katherine Kelly Vidal
*Director of the United States Patent and Trademark Office*

3. The flow sensor according to claim 1, wherein the etched portion of the first substrate has sloped side walls.

4. The flow sensor according to claim 1, wherein the etched portion of the first substrate has sidewalls that are perpendicular to a lower surface of the sensing channel.

5. The flow sensor according to claim 1, wherein the second substrate is configured such that a top surface of the sensing channel is substantially flat.

6. The flow sensor according to claim 1, wherein the second substrate defines at least two apertures, and wherein at least one of the flow inlet channel or flow outlet channel comprises a channel through an aperture defined by the second substrate.

7. The flow sensor according to claim 6, wherein the second substrate comprises a plurality of protrusions on an outer surface of the second substrate, and wherein the one or more of the at least two apertures extend through one or more of the plurality of protrusions.

8. The flow sensor according to claim 7, wherein a top surface of the second substrate is substantially flat such that the flow inlet channel and the flow outlet channel terminate on the top surface of the second substrate.

9. The flow sensor according to claim 6, wherein the second substrate comprises a planar substrate sheet comprising two opposing parallel flat surfaces, and wherein one of the parallel flat surfaces is adjacent to the sensing channel, the flow inlet channel and the flow outlet channel.

10. The flow sensor according to claim 1, wherein the first substrate and the second substrate are configured such that one or both of the flow inlet channel and the flow outlet channel have a larger cross-section at a peripheral end than at an end closest to the sensing channel.

11. The flow sensor according to claim 1, wherein the sensing channel comprises a protective coating, and the second substrate is formed of a semiconductor material.

12. The flow sensor according to claim 1, further comprising a third substrate adjoined to the second substrate on an opposite side of the second substrate to the sensing channel.

13. The flow sensor according to claim 1, wherein the etched portion of the first substrate defines at least two etched cavities and one or more connecting channels, and wherein the etched cavities are fluidly connected to each other by the one or more connecting channels.

14. The flow sensor according to claim 13, wherein the dielectric region comprises at least two dielectric membranes corresponding to the at least two etched cavities; and
wherein the dielectric region comprises a plurality of sensing elements, wherein each of the plurality of sensing elements is formed within a separate dielectric membrane.

15. The flow sensor according to claim 14, wherein the at least two dielectric membranes have different areas, wherein the sensing channel comprises a plurality of sensing channel regions each corresponding to one or more of the plurality of sensing elements, and wherein each of the plurality of sensing channel regions has a different cross-section.

16. The flow sensor according to claim 1, wherein the flow sensor comprises a heating element located within the dielectric membrane, and the dielectric membrane comprises one or more discontinuities located between the heating element and an edge of the dielectric membrane.

17. The flow sensor according to claim 1, wherein a connection substrate comprises a printed circuit board (PCB) material, and wherein the connection substrate comprises a semiconductor chip, and the semiconductor chip comprises integrated circuitry.

18. A method of manufacturing a flow sensor, the method comprising:
forming a first substrate comprising an etched cavity portion, wherein the etched cavity portion extends towards a first side of the first substrate from a second side of the first substrate, wherein the first side of the first substrate and the second side of the first substrate are opposite sides;
forming a dielectric region located on the first side of the first substrate, wherein the dielectric region comprises at least one dielectric membrane located over an etched portion of the first substrate;
forming the flow sensor located on or within the dielectric membrane; and
forming a second substrate adjoining the second side of the first substrate, wherein the first substrate and the second substrate cooperate to form a sensing channel through the flow sensor, wherein the second substrate comprises a protrusion extending towards the dielectric membrane, wherein at least one region of the second substrate that is adjacent to the protrusion is substantially parallel to the second side of the first substrate; and wherein the second substrate comprises two opposing surfaces, and wherein a flow inlet channel forming a first portion of the sensing channel and a flow outlet channel forming a second portion of the sensing channel, are formed at a boundary between the first substrate and the second substrate, and wherein one of the opposing surfaces is adjacent to the sensing channel, the flow inlet channel and the flow outlet channel.

19. The flow sensor according to claim 1, further comprising a sealant between the dielectric region and a connection substrate.

20. The flow sensor according to claim 1, further comprising a connection substrate electrically connected to bond pads on an exterior surface of the dielectric region.

21. The flow sensor according to claim 20, wherein the connection substrate is electrically connected to the bond pads using solder balls, or bumps or pillars formed of copper or gold.

22. The flow sensor according to claim 1, wherein the protrusion extends in a direction substantially perpendicular to the flow inlet channel and the flow outlet channel.

(12) United States Patent
Ali et al.

(10) Patent No.: US 11,965,762 B2
(45) Date of Patent: Apr. 23, 2024

(54) FLOW SENSOR

(71) Applicant: Flusso Limited, Cambridge (GB)

(72) Inventors: Syed Zeeshan Ali, Cambridge (GB); Andrea De Luca, Cambridge (GB); Cerdin Lee, Trumpington (GB); Tim Butler, Cambridge (GB); Ethan Gardner, Kineton (GB); Florin Udrea, Cambridge (GB)

(73) Assignee: Flusso Limited, Cambridge (GB)

(*) Notice: Subject to any disclaimer, the term of this patent is extended or adjusted under 35 U.S.C. 154(b) by 0 days.

(21) Appl. No.: 16/658,725

(22) Filed: Oct. 21, 2019

(65) Prior Publication Data
US 2021/0116280 A1 Apr. 22, 2021

(51) Int. Cl.
*G01F 1/684* (2006.01)
*G01F 1/696* (2006.01)
*G01F 1/688* (2006.01)

(52) U.S. Cl.
CPC ......... *G01F 1/6845* (2013.01); *G01F 1/6847* (2013.01); *G01F 1/696* (2013.01); *G01F 1/6888* (2013.01)

(58) Field of Classification Search
CPC .... G01F 1/6845; G01F 1/6847; G01F 1/6888; G01F 1/696
See application file for complete search history.

(56) References Cited

U.S. PATENT DOCUMENTS

| | | | |
|---|---|---|---|
| 4,548,078 A | 10/1985 | Bohrer et al. | |
| 6,460,411 B1 | 10/2002 | Kersjes et al. | |
| 6,527,835 B1 | 3/2003 | Manginell et al. | |
| 6,898,981 B1* | 5/2005 | Boillat | G01F 1/363 73/756 |
| 6,971,266 B2* | 12/2005 | Kawai | G01F 1/692 73/204.26 |
| 6,981,410 B2* | 1/2006 | Seki | G01F 1/6845 73/204.26 |

(Continued)

FOREIGN PATENT DOCUMENTS

| | | |
|---|---|---|
| DE | 102010028387 A1 | 11/2010 |
| EP | 1365216 A1 | 11/2003 |

(Continued)

OTHER PUBLICATIONS

International Search Report and Written Opinion from corresponding International Application No. PCT/EP2020/079566, dated Jan. 21, 2021, 16 pages.

(Continued)

*Primary Examiner* — Justin N Olamit
(74) *Attorney, Agent, or Firm* — Fisher Broyles, LLP

(57) ABSTRACT

We disclose herein a flow sensor comprising: a first substrate comprising an etched portion, a dielectric region located on a first side of the first substrate, wherein the dielectric region comprises at least one dielectric membrane located over the etched portion of the first substrate, a sensing element located on or within the dielectric membrane, and a second substrate adjoining a second side of the first substrate. The first side of the first substrate and the second side of the first substrate are opposite sides. The first substrate and the second substrate cooperate to form a sensing channel through the flow sensor.

24 Claims, 11 Drawing Sheets